US012602319B2

(12) United States Patent
Nishikawa et al.

(10) Patent No.: US 12,602,319 B2
(45) Date of Patent: Apr. 14, 2026

(54) MEMORY SYSTEM EXECUTING FLUSH COMMAND AND METHOD OF CONTROLLING NONVOLATILE MEMORY UPON RECEIVING FLUSH COMMAND

(71) Applicant: Kioxia Corporation, Tokyo (JP)

(72) Inventors: Suguru Nishikawa, Tokyo (JP); Takehiko Amaki, Yokohama Kanagawa (JP); Shunichi Igahara, Fujisawa Kanagawa (JP); Toshikatsu Hida, Yokohama Kanagawa (JP); Yoshihisa Kojima, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/780,618

(22) Filed: Jul. 23, 2024

(65) Prior Publication Data

US 2025/0094336 A1     Mar. 20, 2025

(30) Foreign Application Priority Data

Sep. 14, 2023    (JP) ................................ 2023-149407

(51) Int. Cl.
 *G06F 12/00*        (2006.01)
 *G06F 12/02*        (2006.01)
(52) U.S. Cl.
 CPC ................................ G06F 12/0246 (2013.01)
(58) Field of Classification Search
 CPC ......... G06F 12/0246; G06F 2212/1032; G06F 2212/7201; G06F 2212/7203; G06F 2212/7206; G06F 2212/7208; G11C 11/56; G11C 11/5628; G11C 16/0483; G11C 16/10; G11C 2211/5641
 USPC ........................................................ 711/103
 See application file for complete search history.

(56) References Cited

U.S. PATENT DOCUMENTS

| | | | |
|---|---|---|---|
| 2004/0037132 A1* | 2/2004 | Suzuki .................... | G11C 11/22 365/202 |
| 2009/0285006 A1* | 11/2009 | Thewes .................... | G11C 7/08 365/205 |
| 2015/0347289 A1 | 12/2015 | Ma et al. | |
| 2019/0095135 A1* | 3/2019 | Hsiao ................... | G11C 29/028 |
| 2020/0027514 A1 | 1/2020 | Miller et al. | |
| 2022/0375513 A1 | 11/2022 | Singidi et al. | |

FOREIGN PATENT DOCUMENTS

TW            I657454 B   *   4/2019   ............. G11C 16/08

* cited by examiner

*Primary Examiner* — Mardochee Chery
(74) *Attorney, Agent, or Firm* — Maier & Maier, PLLC

(57) ABSTRACT

According to an embodiment, a memory system includes a nonvolatile memory including memory cells and a memory controller coupled to the nonvolatile memory. Each of the plurality of memory cells is configured to store, in a non-volatile manner, a plurality of bits of data. The memory controller is configured to, in a case where a first memory cell stores valid first bit data as a first bit and does not store data as a second bit, and a second memory cell stores valid second bit data as the first bit and does not store data as the second bit, and upon reception of a flush command from a host, read the second bit data from the second memory cell and write the second bit data read from the second memory cell to the first memory cell as the second bit.

20 Claims, 30 Drawing Sheets

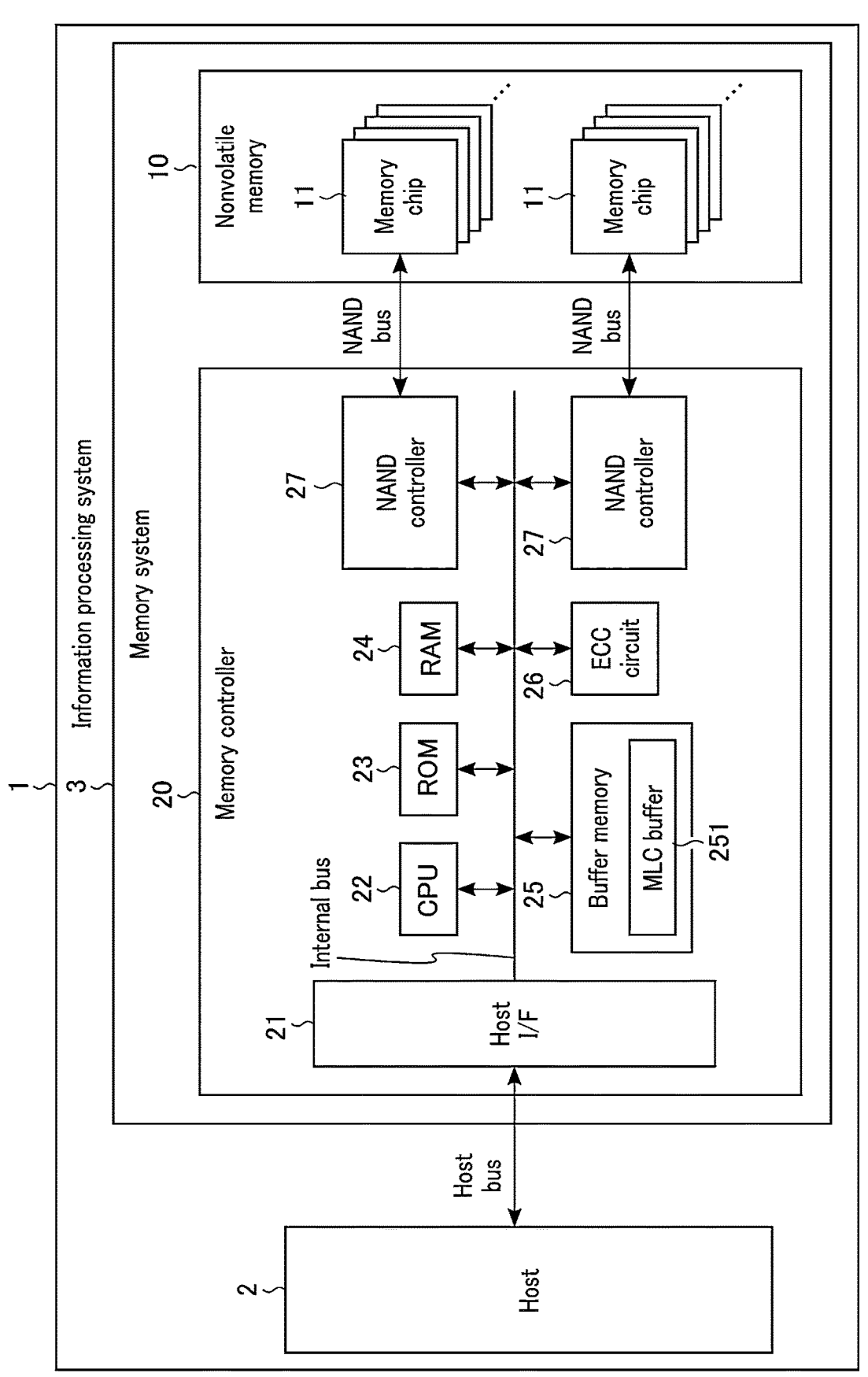
F I G. 1

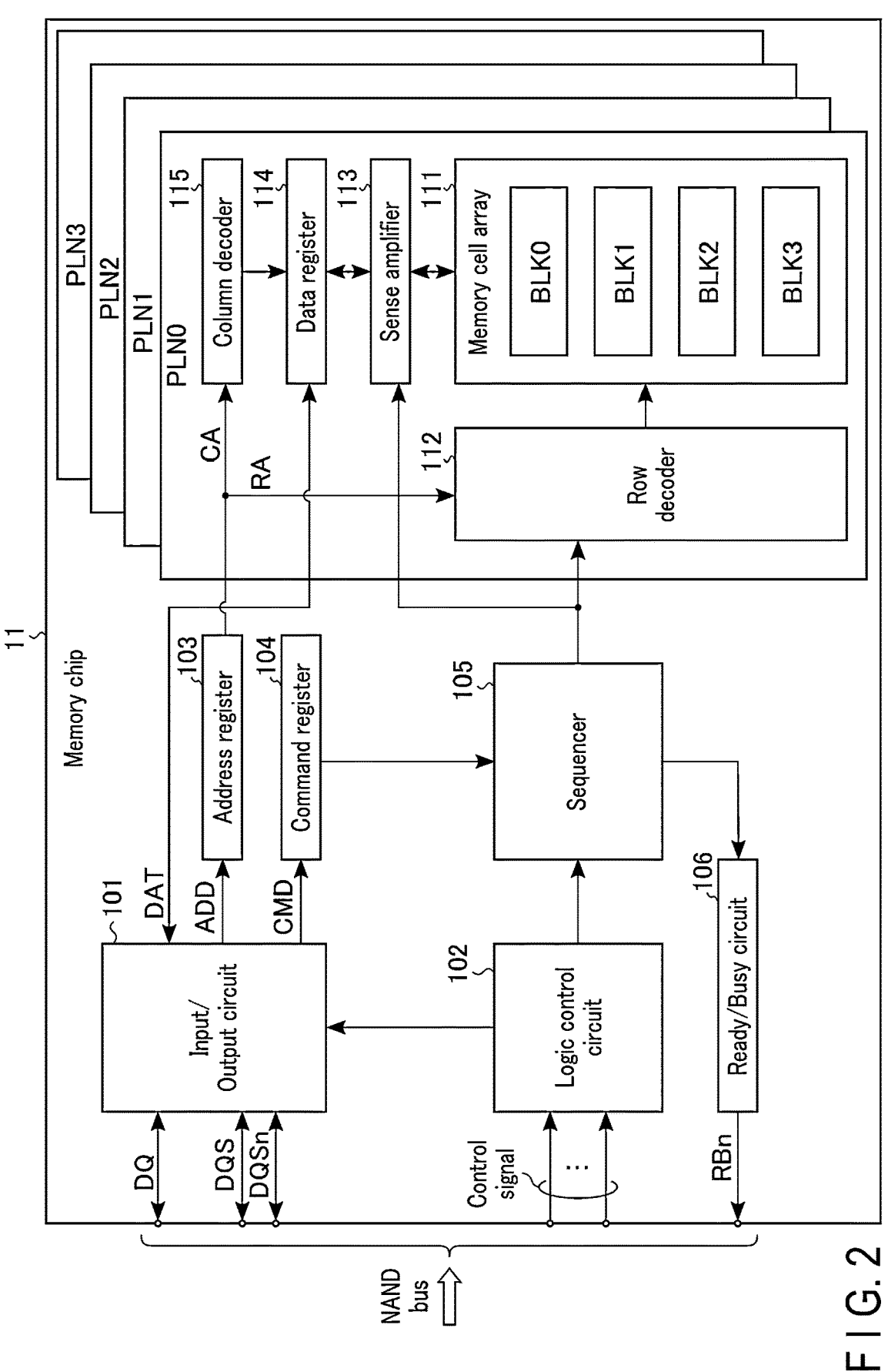
F I G. 2

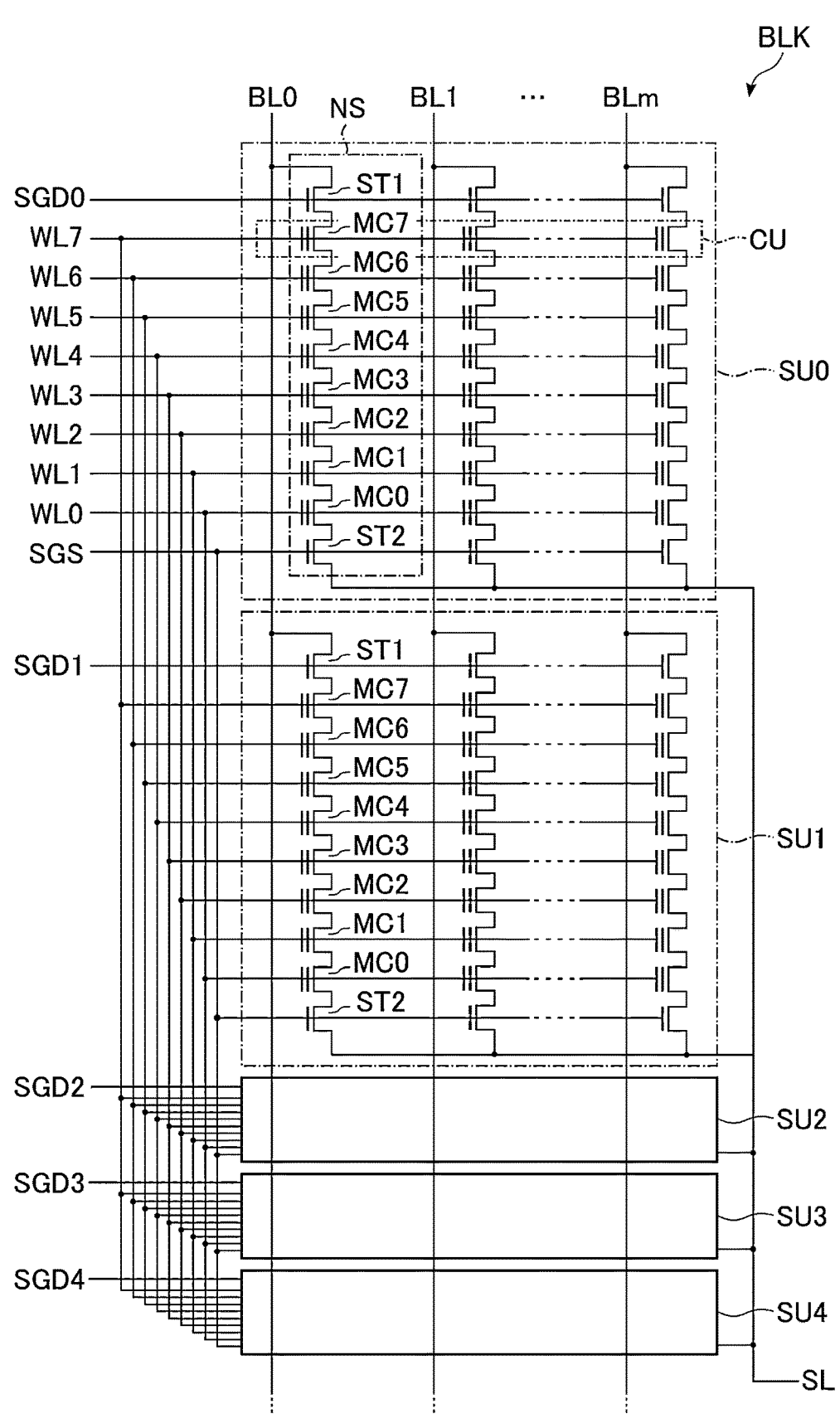
F I G. 3

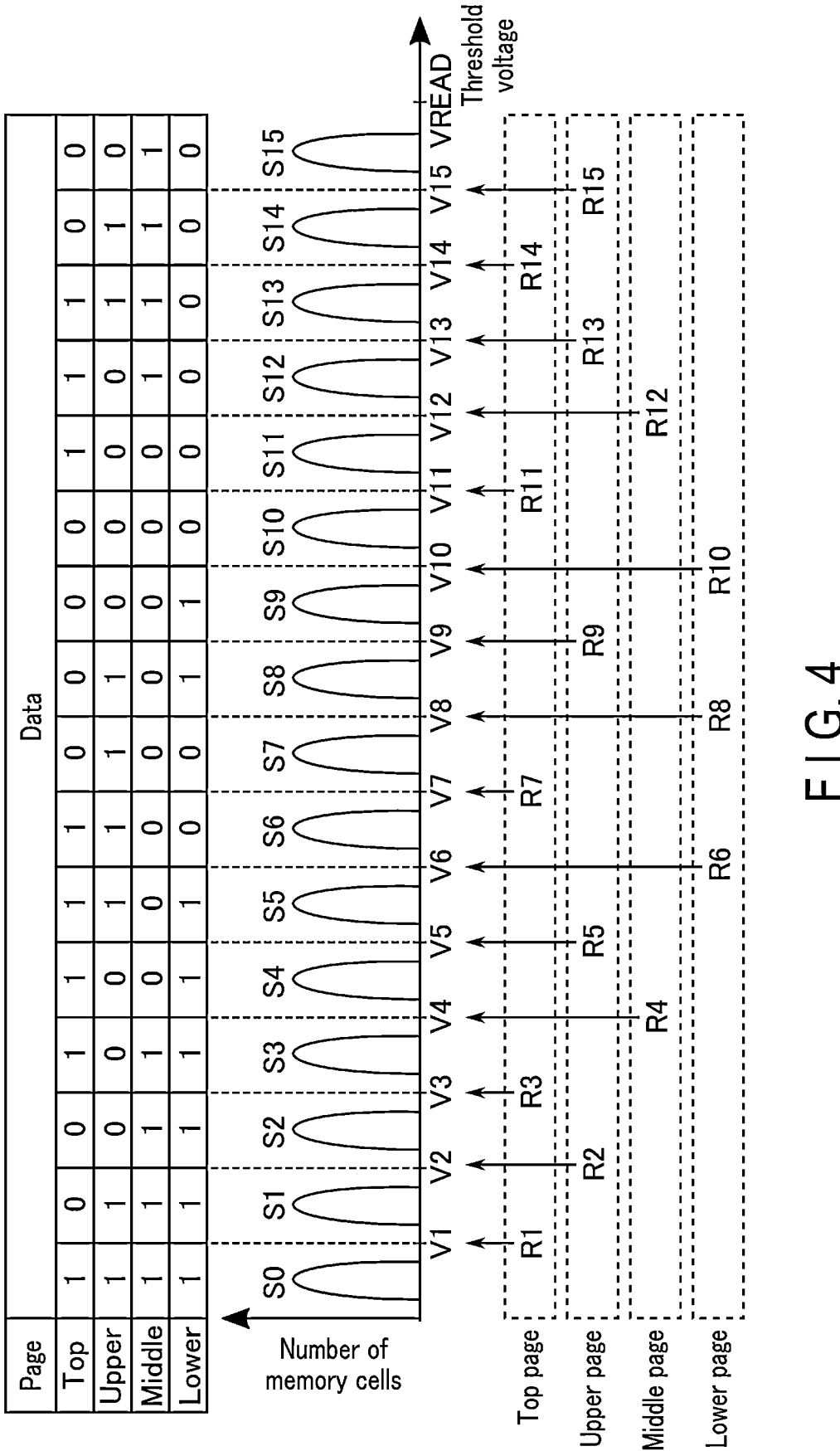
F I G. 4

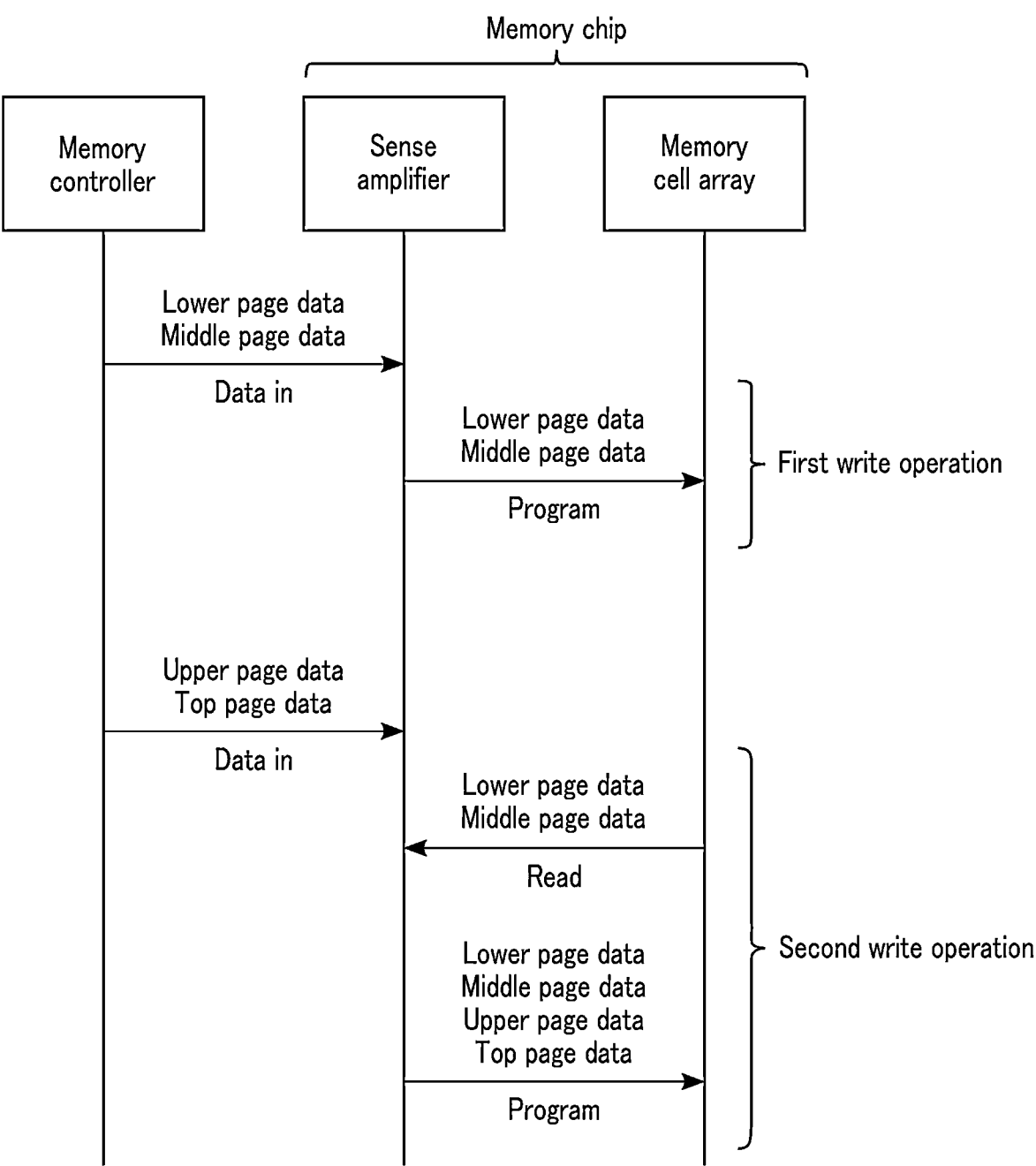
F I G. 5

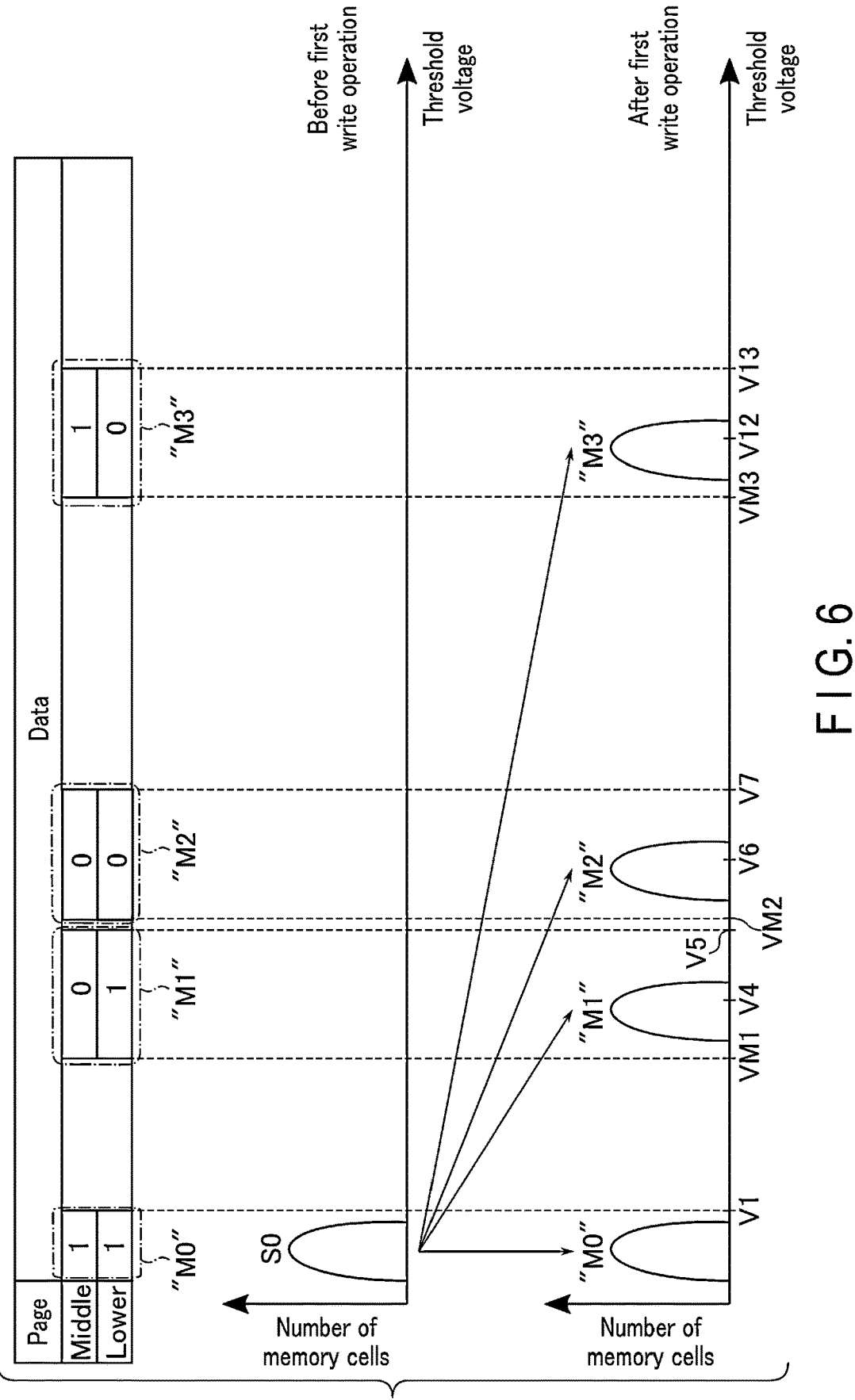
F I G. 6

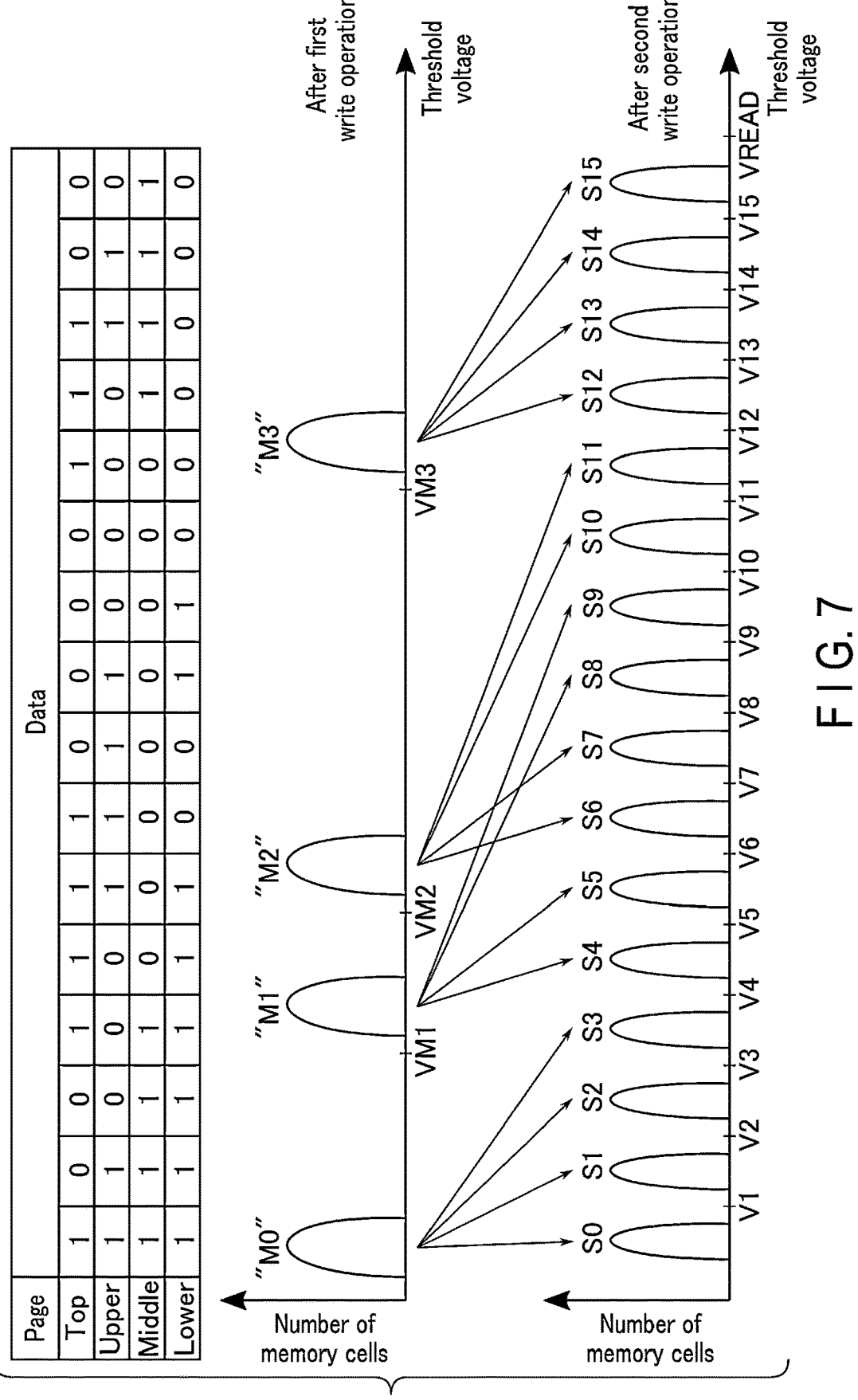
F I G. 7

LUT
| LCAN | Physical address | | | | | Page data number |
|---|---|---|---|---|---|---|
| | LBN | PBN | WL | SU | PT | |
| 0 | 0 | 0 | 0 | 0 | Lower | D0_0 |
| 1 | 0 | 1 | 0 | 0 | Lower | D0_1 |
| 2 | 0 | 2 | 0 | 0 | Lower | D0_2 |
| 3 | 0 | 3 | 0 | 0 | Lower | D0_3 |
| 4 | 0 | 0 | 0 | 0 | Middle | D0_4 |
| 5 | 0 | 1 | 0 | 0 | Middle | D0_5 |
| 6 | 0 | 2 | 0 | 0 | Middle | D0_6 |
| 7 | 0 | 3 | 0 | 0 | Middle | D0_7 |
| ⋮ | ⋮ | ⋮ | ⋮ | ⋮ | ⋮ | |
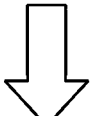
| Write destination area | | | | Data assignment | | | |
|---|---|---|---|---|---|---|---|
| LBN | | | | 0 | | | |
| PBN | | | | 0 | 1 | 2 | 3 |
| WL0 | SU0 | WRT1 | L | D0_0 | D0_1 | D0_2 | D0_3 |
| | | | M | D0_4 | D0_5 | D0_6 | D0_7 |
| | | WRT2 | U | | | | |
| | | | T | | | | |
F I G. 8

FIG. 9

Former → Latter

| Write destination area | | | | Data assignment | | | | | | | |
|---|---|---|---|---|---|---|---|---|---|---|---|
| LBN | | | | 0 | | | | 1 | | | |
| PBN | | | | 0 | 1 | 2 | 3 | 4 | 5 | 6 | 7 |
| WL0 | SU0 | WRT1 | L | D0_0 | D0_1 | D0_2 | D0_3 | D1_0 | D1_1 | D1_2 | D1_3 |
| | | | M | D0_4 | D0_5 | D0_6 | D0_7 | D1_4 | D1_5 | D1_6 | D1_7 |
| | | WRT2 | U | D6_0 | D6_1 | D6_2 | D6_3 | D7_0 | D7_1 | D7_2 | D7_3 |
| | | | T | D6_4 | D6_5 | D6_6 | D6_7 | D7_4 | D7_5 | D7_6 | D7_7 |
| | SU1 | WRT1 | L | D2_0 | D2_1 | D2_2 | D2_3 | D3_0 | D3_1 | D3_2 | D3_3 |
| | | | M | D2_4 | D2_5 | D2_6 | D2_7 | D3_4 | D3_5 | D3_6 | D3_7 |
| | | WRT2 | U | ★ (Write pointer) | | | | | | | |
| | | | T | | | | | | | | |
| WL1 | SU0 | WRT1 | L | D4_0 | D4_1 | D4_2 | D4_3 | D5_0 | D5_1 | D5_2 | D5_3 |
| | | | M | D4_4 | D4_5 | D4_6 | D4_7 | D5_4 | D5_5 | D5_6 | D5_7 |
| | | WRT2 | U | | | | | | | | |
| | | | T | | | | | | | | |
| | SU1 | WRT1 | L | D8_0 | D8_1 | D8_2 | D8_3 | D9_0 | D9_1 | D9_2 | D9_3 |
| | | | M | D8_4 | D8_5 | D8_6 | D8_7 | D9_4 | D9_5 | D9_6 | D9_7 |
| | | WRT2 | U | | | | | | | | |
| | | | T | | | | | | | | |

MLC tail address (D9_7)

Former → Latter

Before reception of flush command
| Write destination area | | | | Data assignment | | | |
|---|---|---|---|---|---|---|---|
| LBN | | | | 0 | | | |
| PBN | | | | 0 | 1 | 2 | 3 |
| WL0 | SU0 | WRT1 | L | D0_0 | D0_1 | D0_2 | D0_3 |
| | | | M | D0_4 | D0_5 | D0_6 | D0_7 |
| | | WRT2 | U | 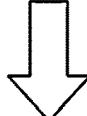 | | | |
| | | | T | | | | |
| | SU1 | WRT1 | L | D1_0 | D1_1 | D1_2 | D1_3 |
| | | | M | D1_4 | D1_5 | D1_6 | D1_7 |
| | | WRT2 | U | | | | |
| | | | T | | | | |
Write pointer
MLC tail address
After transmission of flush command completion response
| Write destination area | | | | Data assignment | | | |
|---|---|---|---|---|---|---|---|
| LBN | | | | 0 | | | |
| PBN | | | | 0 | 1 | 2 | 3 |
| WL0 | SU0 | WRT1 | L | D0_0 | D0_1 | D0_2 | D0_3 |
| | | | M | D0_4 | D0_5 | D0_6 | D0_7 |
| | | WRT2 | U | D1_7 | D1_6 | D1_5 | D1_4 |
| | | | T | D1_3 | D1_2 | D1_1 | D1_0 |
| | SU1 | WRT1 | L | D1_0 | D1_1 | D1_2 | D1_3 |
| | | | M | D1_4 | D1_5 | D1_6 | D1_7 |
| | | WRT2 | U | | | | |
| | | | T | | | | |
Copy
Invalid data
F I G. 10

After transmission of flush command completion response

| LCA | Physical address | | | | | Data |
|---|---|---|---|---|---|---|
| | LBN | PBN | WL | SU | PT | |
| 0 | 0 | 0 | 0 | 0 | Lower | D0_0 |
| 1 | 0 | 1 | 0 | 0 | Lower | D0_1 |
| 2 | 0 | 2 | 0 | 0 | Lower | D0_2 |
| 3 | 0 | 3 | 0 | 0 | Lower | D0_3 |
| 4 | 0 | 0 | 0 | 0 | Middle | D0_4 |
| 5 | 0 | 1 | 0 | 0 | Middle | D0_5 |
| 6 | 0 | 2 | 0 | 0 | Middle | D0_6 |
| 7 | 0 | 3 | 0 | 0 | Middle | D0_7 |
| 8 | 0 | 3 | 0 | 0 | Top | D1_0 |
| 9 | 0 | 2 | 0 | 0 | Top | D1_1 |
| 10 | 0 | 1 | 0 | 0 | Top | D1_2 |
| 11 | 0 | 0 | 0 | 0 | Top | D1_3 |
| 12 | 0 | 3 | 0 | 0 | Upper | D1_4 |
| 13 | 0 | 2 | 0 | 0 | Upper | D1_5 |
| 14 | 0 | 1 | 0 | 0 | Upper | D1_6 |
| 15 | 0 | 0 | 0 | 0 | Upper | D1_7 |

Update

Before reception of flush command

| LCA | Physical address | | | | | Data |
|---|---|---|---|---|---|---|
| | LBN | PBN | WL | SU | PT | |
| 0 | 0 | 0 | 0 | 0 | Lower | D0_0 |
| 1 | 0 | 1 | 0 | 0 | Lower | D0_1 |
| 2 | 0 | 2 | 0 | 0 | Lower | D0_2 |
| 3 | 0 | 3 | 0 | 0 | Lower | D0_3 |
| 4 | 0 | 0 | 0 | 0 | Middle | D0_4 |
| 5 | 0 | 1 | 0 | 0 | Middle | D0_5 |
| 6 | 0 | 2 | 0 | 0 | Middle | D0_6 |
| 7 | 0 | 3 | 0 | 0 | Middle | D0_7 |
| 8 | 0 | 0 | 0 | 1 | Lower | D1_0 |
| 9 | 0 | 1 | 0 | 1 | Lower | D1_1 |
| 10 | 0 | 2 | 0 | 1 | Lower | D1_2 |
| 11 | 0 | 3 | 0 | 1 | Lower | D1_3 |
| 12 | 0 | 0 | 0 | 1 | Middle | D1_4 |
| 13 | 0 | 1 | 0 | 1 | Middle | D1_5 |
| 14 | 0 | 2 | 0 | 1 | Middle | D1_6 |
| 15 | 0 | 3 | 0 | 1 | Middle | D1_7 |

F I G. 11

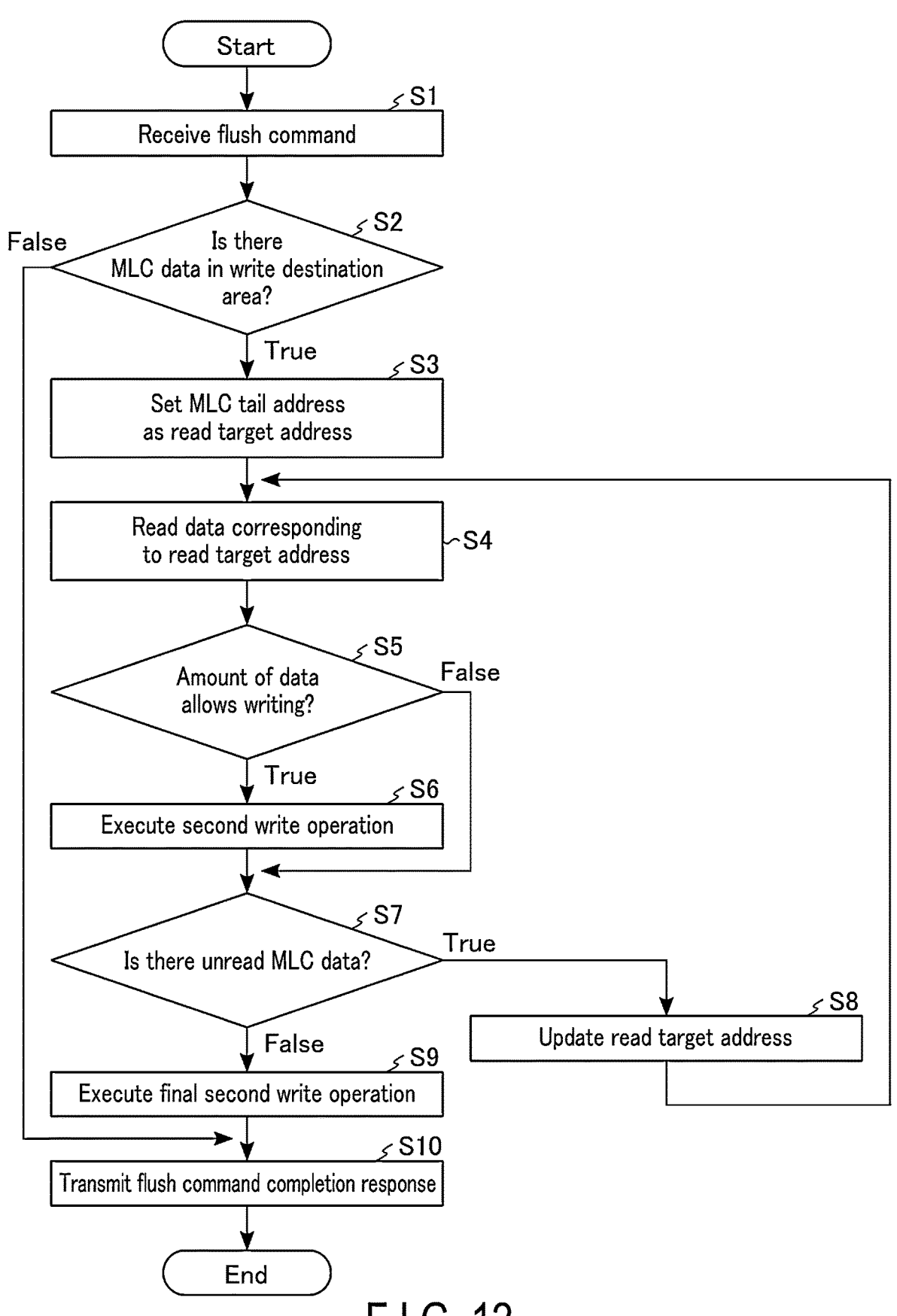
F I G. 12

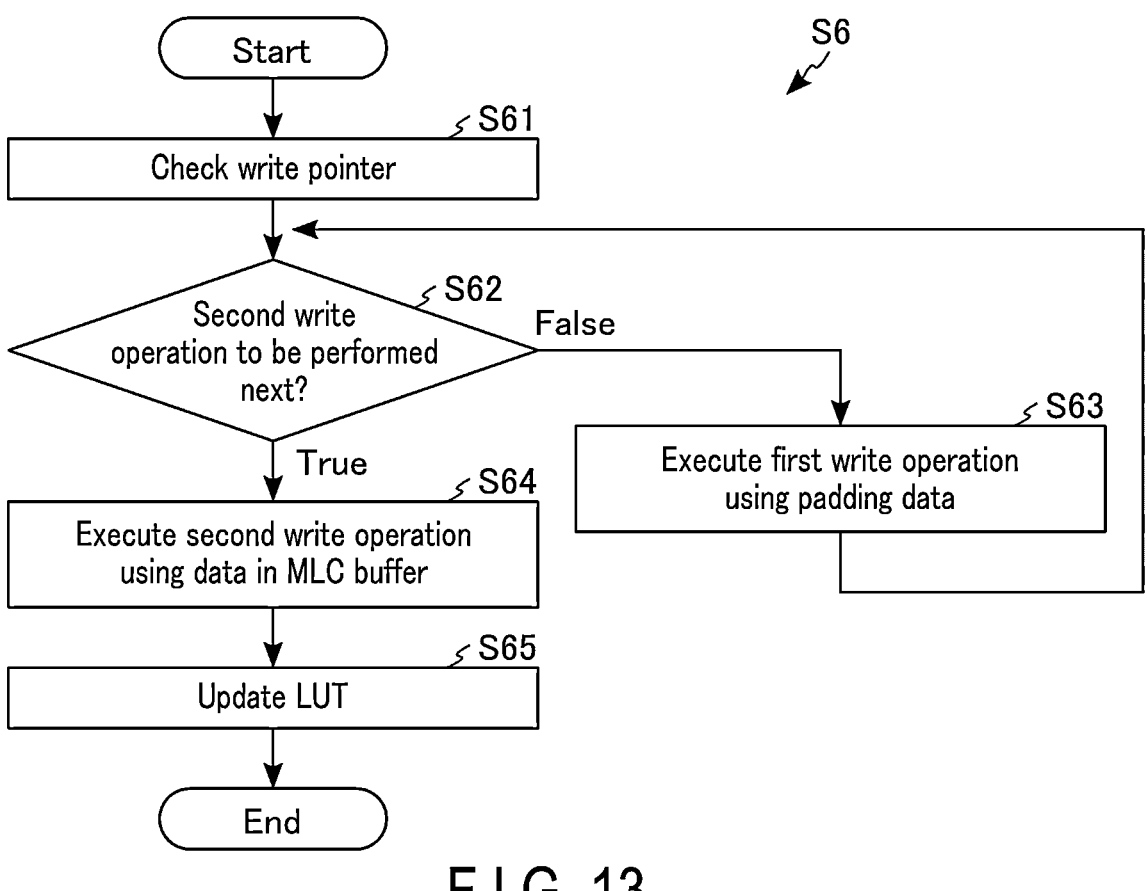
F I G. 13

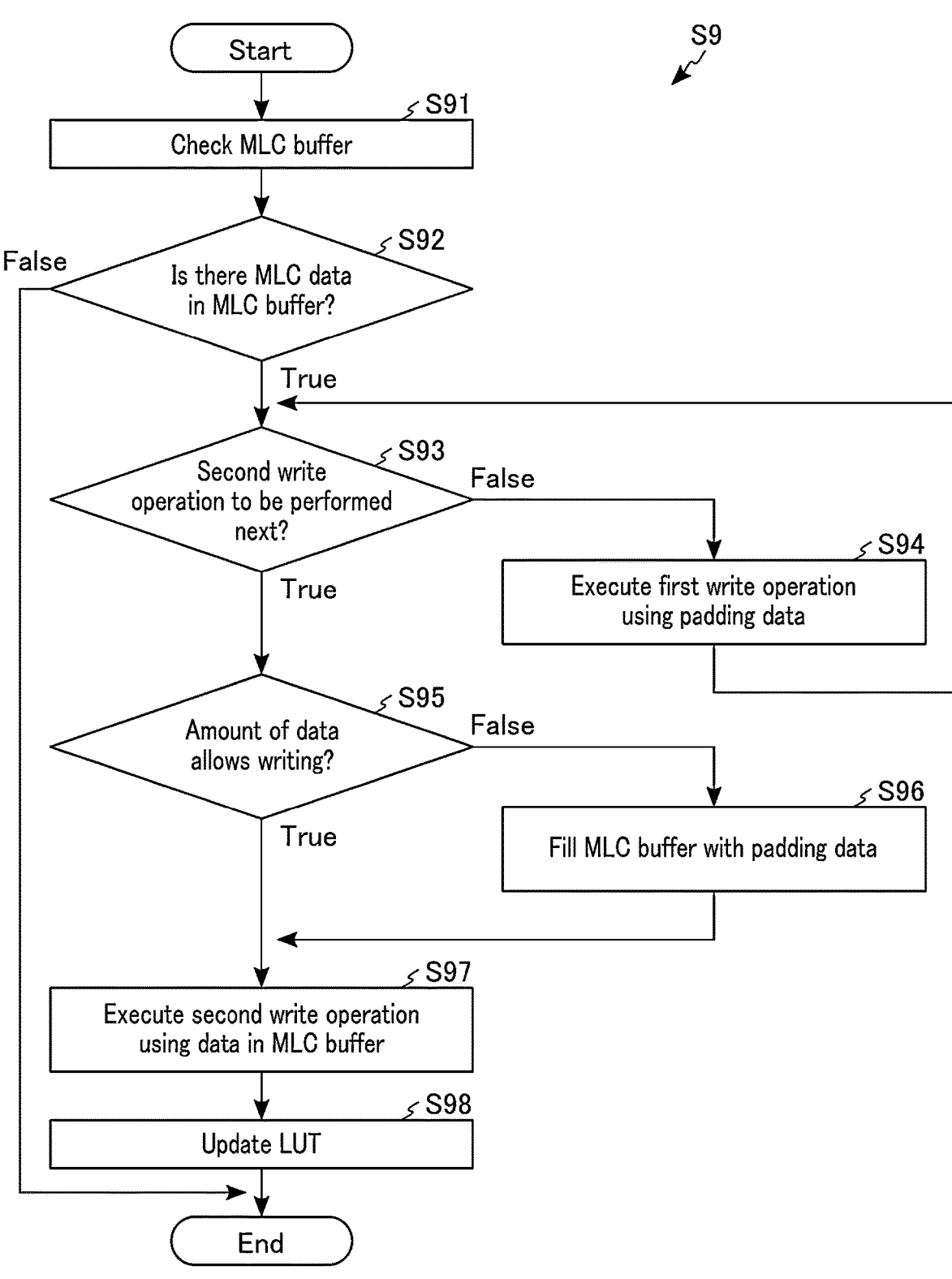
F I G. 14

Read target address (initial position)

Write destination area

Data assignment

LBN

PBN

| | 0 | | | | 1 | | |
|---|---|---|---|---|---|---|---|
| 0 | 1 | 2 | 3 | 4 | 5 | 6 | 7 |

WL0

SU0

WRT1 — L / M : First write operation completed

WRT2 — U / T : Second write operation completed

SU1

WRT1 — L / M : 47 ← 46 ← 45 ← 44 39 ← 38 ← 37 ← 36 / 43 ← 42 ← 41 ← 40 35 ← 34 ← 33 ← 32

WRT2 — U / T : Second write operation not completed

SU0

WRT1 — L / M : 31 ← 30 ← 29 ← 28 23 ← 22 ← 21 ← 20 / 27 ← 26 ← 25 ← 24 19 ← 18 ← 17 ← 16

WRT2 — U / T : Second write operation not completed

WL1

SU1

WRT1 — L / M : 15 ← 14 ← 13 ← 12 7 ← 6 ← 5 ← 4 / 11 ← 10 ← 9 ← 8 3 ← 2 ← 1 ← ⓪

WRT2 — U / T : Second write operation not completed

F I G. 15

F I G. 16

MLC buffer

|  | 0 | 1 | 2 | 3 |
|---|---|---|---|---|
| U |  |  |  |  |
| T |  |  |  |  |

Legend:
- D··· : Valid data
- D··· : Invalid data
- : Read target address
- ★ : Write pointer

Write destination area / Data assignment

| | LBN | | | 0 | | | | 1 | | | |
|---|---|---|---|---|---|---|---|---|---|---|---|
| | PBN | | 0 | 1 | 2 | 3 | 4 | 5 | 6 | 7 | |
| SU0 | WRT1 | L | D0_0 | D0_1 | D0_2 | D0_3 | D1_0 | D1_1 | D1_2 | D1_3 | |
| | | M | D0_4 | D0_5 | D0_6 | D0_7 | D1_4 | D1_5 | D1_6 | D1_7 | |
| | WRT2 | U | | | | | | | | | |
| | | T | | | | | | | | | |
| SU1 | WRT1 | L | D2_0 | D2_1 | D2_2 | D2_3 | D3_0 | D3_1 | D3_2 | D3_3 | |
| | | M | D2_4 | D2_5 | D2_6 | D2_7 | D3_4 | D3_5 | D3_6 | D3_7 | |
| | WRT2 | U | | | | | | | | | |
| | | T | | | | | | | | | |
| SU0 | WRT1 | L | ★ | | | | | | | | |
| | | M | | | | | | | | | |
| | WRT2 | U | | | | | | | | | |
| | | T | | | | | | | | | |
| SU1 | WRT1 | L | | | | | | | | | |
| | | M | | | | | | | | | |
| | WRT2 | U | | | | | | | | | |
| | | T | | | | | | | | | |

WL0 (SU0, SU1 upper); WL1 (SU0, SU1 lower)

MLC tail address → D3_7

F I G. 17

F I G. 18

First write operation

MLC buffer

| / | 0 | 1 | 2 | 3 |
|---|---|---|---|---|
| U | D3_7 | D3_6 | D3_4 | D3_3 |
| T | D3_2 | D3_1 | D3_0 | D2_7 |

Legend:
- D··· : Valid data
- D··· : Invalid data
- D··· : New invalid data
- (dashed box) : Read target address
- ☆ : Write pointer

Data assignment

| Write destination area | | | LBN | | 0 | | | | 1 | | | |
|---|---|---|---|---|---|---|---|---|---|---|---|---|
| | | PBN | | 0 | 1 | 2 | 3 | 4 | 5 | 6 | 7 |
| WL0 | SU0 | WRT1 | L | D0_0 | D0_1 | D0_2 | D0_3 | D1_0 | D1_1 | D1_2 | D1_3 |
| | | | M | D0_4 | D0_5 | D0_6 | D0_7 | D1_4 | D1_5 | D1_6 | D1_7 |
| | | WRT2 | U | ☆ | | | | | | | |
| | | | T | | | | | | | | |
| | SU1 | WRT1 | L | D2_0 | D2_1 | D2_2 | D2_3 | D3_0 | D3_1 | D3_2 | D3_3 |
| | | | M | D2_4 | D2_5 | D2_6 | D2_7 | D3_4 | D3_5 | D3_6 | D3_7 |
| | | WRT2 | U | | | | | | | | |
| | | | T | | | | | | | | |
| WL1 | SU0 | WRT1 | L | PD | PD | PD | PD | PD | PD | PD | PD |
| | | | M | PD | PD | PD | PD | PD | PD | PD | PD |
| | | WRT2 | U | | | | | | | | |
| | | | T | | | | | | | | |
| | SU1 | WRT1 | L | | | | | | | | |
| | | | M | | | | | | | | |
| | | WRT2 | U | | | | | | | | |
| | | | T | | | | | | | | |

F I G. 19

Write destination area | Data assignment

| | | | | | 0 | | | | 1 | | | |
|---|---|---|---|---|---|---|---|---|---|---|---|---|
| LBN | | | | 0 | 1 | 2 | 3 | 4 | 5 | 6 | 7 |
| PBN | | | | | | | | | | | |
| WL0 | SU0 | WRT1 | L | D0_0 | D0_1 | D0_2 | D0_3 | D1_0 | D1_1 | D1_2 | D1_3 |
| | | | M | D0_4 | D0_5 | D0_6 | D0_7 | D1_4 | D1_5 | D1_6 | D1_7 |
| | | WRT2 | U | D3_7 | D3_6 | D3_4 | D3_3 | | | | |
| | | | T | D3_2 | D3_1 | D3_0 | D2_7 | | | | |
| | SU1 | WRT1 | L | D2_0 | D2_1 | D2_2 | D2_3 | D3_0 | D3_1 | D3_2 | D3_3 |
| | | | M | D2_4 | D2_5 | D2_6 | D2_7 | D3_4 | D3_5 | D3_6 | D3_7 |
| | | WRT2 | U | | | | | | | | |
| | | | T | | | | | | | | |
| WL1 | SU0 | WRT1 | L | PD | PD | PD | PD | PD | PD | PD | PD |
| | | | M | PD | PD | PD | PD | PD | PD | PD | PD |
| | | WRT2 | U | | | | | | | | |
| | | | T | | | | | | | | |
| | SU1 | WRT1 | L | | | | | | | | |
| | | | M | | | | | | | | |
| | | WRT2 | U | | | | | | | | |
| | | | T | | | | | | | | |

MLC buffer

| | 0 | 1 | 2 | 3 |
|---|---|---|---|---|
| U | D3_7 | D3_6 | D3_4 | D3_3 |
| T | D3_2 | D3_1 | D3_0 | D2_7 |

Second write operation

| | |
|---|---|
| D··· | : Valid data |
| D··· | : Invalid data |
| D··· | : New invalid data |
| | : Read target address |
| ☆ | : Write pointer |

F I G. 20

F I G. 21

MLC buffer

| | 0 | 1 | 2 | 3 |
|---|---|---|---|---|
| U | D2_4 | D2_3 | D2_1 | D2_0 |
| T | D1_7 | D1_6 | D1_5 | D1_4 |

Second write operation

Legend
- D··· : Valid data
- D···· : Invalid data
- D···· : New invalid data
- [ ] : Read target address
- ★ : Write pointer

Data assignment

| Write destination area | | | LBN | 0 | | | | 1 | | | |
|---|---|---|---|---|---|---|---|---|---|---|---|
| | | PBN | 0 | 1 | 2 | 3 | 4 | 5 | 6 | 7 |
| WL0 | SU0 | WRT1 | L | D0_0 | D0_1 | D0_2 | D0_3 | D1_0 | D1_1 | D1_2 | D1_3 |
| | | | M | D0_4 | D0_5 | D0_6 | D0_7 | D1_4 | D1_5 | D1_6 | D1_7 |
| | | WRT2 | U | D3_7 | D3_6 | D3_4 | D3_3 | D2_4 | D2_3 | D2_1 | D2_0 |
| | | | T | D3_2 | D3_1 | D3_0 | D2_7 | D1_7 | D1_6 | D1_5 | D1_4 |
| | SU1 | WRT1 | L | D2_0 | D2_1 | D2_2 | D2_3 | D3_0 | D3_1 | D3_2 | D3_3 |
| | | | M | D2_4 | D2_5 | D2_6 | D2_7 | D3_4 | D3_5 | D3_6 | D3_7 |
| | | WRT2 | U | | | | | | | | |
| | | | T | | | | | | | | |
| WL1 | SU0 | WRT1 | L | PD | PD | PD | PD | PD | PD | PD | PD |
| | | | M | PD | PD | PD | PD | PD | PD | PD | PD |
| | | WRT2 | U | | | | | | | | |
| | | | T | | | | | | | | |
| | SU1 | WRT1 | L | ★ | | | | | | | |
| | | | M | | | | | | | | |
| | | WRT2 | U | | | | | | | | |
| | | | T | | | | | | | | |

FIG. 22

Legend

| Symbol | Meaning |
|---|---|
| D··· (solid box) | : Valid data |
| D··· (hatched) | : Invalid data |
| D··· (heavy hatched) | : New invalid data |
| (dashed box) | : Read target address |
| ☆ (star) | : Write pointer |

MLC buffer

| | 0 | 1 | 2 | 3 |
|---|---|---|---|---|
| U | | | | |
| T | | | | |

Data assignment / Write destination area

| WL | SU | WRT | L/M/U/T | LBN 0 | | | | LBN 1 | | | |
|---|---|---|---|---|---|---|---|---|---|---|---|
| | | | PBN | 0 | 1 | 2 | 3 | 4 | 5 | 6 | 7 |
| WL0 | SU0 | WRT1 | L | D0_0 | D0_1 | D0_2 | D0_3 | D1_0 | D1_1 | D1_2 | D1_3 |
| | | WRT1 | M | D0_4 | D0_5 | D0_6 | D0_7 | D1_4 | D1_5 | D1_6 | D1_7 |
| | | WRT2 | U | D3_7 | D3_6 | D3_4 | D3_3 | D2_4 | D2_3 | D2_1 | D2_0 |
| | | WRT2 | T | D3_2 | D3_1 | D3_0 | D2_7 | D1_7 | D1_6 | D1_5 | D1_4 |
| | SU1 | WRT1 | L | D2_0 | D2_1 | D2_2 | D2_3 | D3_0 | D3_1 | D3_2 | D3_3 |
| | | WRT1 | M | D2_4 | D2_5 | D2_6 | D2_7 | D3_4 | D3_5 | D3_6 | D3_7 |
| | | WRT2 | U | D10_0 | D10_1 | D10_2 | D10_3 | ☆ | | | |
| | | WRT2 | T | D10_4 | D10_5 | D10_6 | D10_7 | | | | |
| WL1 | SU0 | WRT1 | L | PD | PD | PD | PD | PD | PD | PD | PD |
| | | WRT1 | M | PD | PD | PD | PD | PD | PD | PD | PD |
| | | WRT2 | U | | | | | | | | |
| | | WRT2 | T | | | | | | | | |
| | SU1 | WRT1 | L | D8_0 | D8_1 | D8_2 | D8_3 | D9_0 | D9_1 | D9_2 | D9_3 |
| | | WRT1 | M | D8_4 | D8_5 | D8_6 | D8_7 | D9_4 | D9_5 | D9_6 | D9_7 |
| | | WRT2 | U | | | | | | | | |
| | | WRT2 | T | | | | | | | | |

MLC tail address → D9_7

F I G. 23

| Write destination area | | | | | | | | | | | | | MLC buffer | | | | |
|---|---|---|---|---|---|---|---|---|---|---|---|---|---|---|---|---|---|
| LBN | | | | 0 | | | | 1 | | | | | | 0 | 1 | 2 | 3 |
| PBN | | | 0 | 1 | 2 | 3 | 4 | 5 | 6 | 7 | | | U | D9_7 | D9_6 | D9_5 | D9_4 |
| WL0 | SU0 | WRT1 | L | D0_0 | D0_1 | D0_2 | D0_3 | D1_0 | D1_1 | D1_2 | D1_3 | | | T | | | |
| | | | M | D0_4 | D0_5 | D0_6 | D0_7 | D1_4 | D1_5 | D1_6 | D1_7 | | | | | | |
| | | WRT2 | U | D3_7 | D3_6 | D3_4 | D3_3 | D2_0 | D2_3 | D2_1 | D2_0 | | | | | | |
| | | | T | D3_2 | D3_1 | D3_0 | D2_7 | D1_7 | D1_6 | D1_5 | D1_4 | | | | | | |
| | SU1 | WRT1 | L | D2_0 | D2_1 | D2_2 | D2_3 | D3_0 | D3_1 | D3_2 | D3_3 | | | | | | |
| | | | M | D2_4 | D2_5 | D2_6 | D2_7 | D3_4 | D3_5 | D3_6 | D3_7 | | | | | | |
| | | WRT2 | U | D10_0 | D10_1 | D10_2 | D10_3 | | | | | | | | | | |
| | | | T | D10_4 | D10_5 | D10_6 | D10_7 | | | | | | | | | | |
| WL1 | SU0 | WRT1 | L | PD | PD | PD | PD | PD | PD | PD | PD | | | | | | |
| | | | M | PD | PD | PD | PD | PD | PD | PD | PD | | | | | | |
| | | WRT2 | U | | | | | | | | | | | | | | |
| | | | T | | | | | | | | | | | | | | |
| | SU1 | WRT1 | L | D8_0 | D8_1 | D8_2 | D8_3 | D9_0 | D9_1 | D9_2 | D9_3 | | | | | | |
| | | | M | D8_4 | D8_5 | D8_6 | D8_7 | D9_4 | D9_5 | D9_6 | D9_7 | | | | | | |
| | | WRT2 | U | | | | | | | | | | | | | | |
| | | | T | | | | | | | | | | | | | | |

Data assignment

Read operation

: Valid data
: Invalid data
: New invalid data
: Read target address
: Write pointer

F I G. 24

Data assignment

| Write destination area | LBN | | | 0 | | | | 1 | | | |
|---|---|---|---|---|---|---|---|---|---|---|---|
| | PBN | | 0 | 1 | 2 | 3 | 4 | 5 | 6 | 7 |
| WL0 SU0 | WRT1 | L | D0_0 | D0_1 | D0_2 | D0_3 | D1_0 | D1_1 | D1_2 | D1_3 |
| | | M | D0_4 | D0_5 | D0_6 | D0_7 | D1_4 | D1_5 | D1_6 | D1_7 |
| | WRT2 | U | D3_7 | D3_6 | D3_4 | D3_3 | D2_4 | D2_3 | D2_1 | D2_0 |
| | | T | D3_2 | D3_1 | D3_0 | D2_7 | D1_7 | D1_6 | D1_5 | D1_4 |
| WL0 SU1 | WRT1 | L | D2_0 | D2_1 | D2_2 | D2_3 | D3_0 | D3_1 | D3_2 | D3_3 |
| | | M | D2_4 | D2_5 | D2_6 | D2_7 | D3_4 | D3_5 | D3_6 | D3_7 |
| | WRT2 | U | D10_0 | D10_1 | D10_2 | D10_3 | ☆ | | | |
| | | T | D10_4 | D10_5 | D10_6 | D10_7 | | | | |
| WL1 SU0 | WRT1 | L | PD | PD | PD | PD | PD | PD | PD | PD |
| | | M | PD | PD | PD | PD | PD | PD | PD | PD |
| | WRT2 | U | | | | | | | | |
| | | T | | | | | | | | |
| WL1 SU1 | WRT1 | L | D8_0 | D8_1 | D8_2 | D8_3 | D9_0 | D9_1 | D9_2 | D9_3 |
| | | M | D8_4 | D8_5 | D8_6 | D8_7 | D9_4 | D9_5 | D9_6 | D9_7 |
| | WRT2 | U | | | | | | | | |
| | | T | | | | | | | | |

MLC buffer

| | 0 | 1 | 2 | 3 |
|---|---|---|---|---|
| U | D9_7 | D9_6 | D9_5 | D9_4 |
| T | PD | PD | PD | PD |

Filling of padding

Legend:

| | |
|---|---|
| D··· | : Valid data |
| D··· | : Invalid data |
| D··· | : New invalid data |
| (dashed box) | : Read target address |
| ☆ | : Write pointer |

F I G. 25

Before reception of flush command

| Write destination area | | | | Data assignment | | | |
|---|---|---|---|---|---|---|---|
| LBN | | | | 0 | | | |
| PBN | | | | 0 | 1 | 2 | 3 |
| WL0 | SU0 | WRT1 | L | D0_0 | D0_1 | D0_2 | D0_3 |
| | | | M | D0_4 | D0_5 | D0_6 | D0_7 |
| | | WRT2 | U | | | | |
| | | | T | | | | |
| | SU1 | WRT1 | L | D1_0 | D1_1 | D1_2 | D1_3 |
| | | | M | D1_4 | D1_5 | D1_6 | D1_7 |
| | | WRT2 | U | | | | |
| | | | T | | | | |

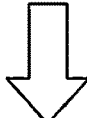 Write pointer

After transmission of flush command completion response

| Write destination area | | | | Data assignment | | | |
|---|---|---|---|---|---|---|---|
| LBN | | | | 0 | | | |
| PBN | | | | 0 | 1 | 2 | 3 |
| WL0 | SU0 | WRT1 | L | D0_0 | D0_1 | D0_2 | D0_3 |
| | | | M | D0_4 | D0_5 | D0_6 | D0_7 |
| | | WRT2 | U | D0_0 | D0_1 | D0_2 | D0_3 |
| | | | T | D0_4 | D0_5 | D0_6 | D0_7 |
| | SU1 | WRT1 | L | D1_0 | D1_1 | D1_2 | D1_3 |
| | | | M | D1_4 | D1_5 | D1_6 | D1_7 |
| | | WRT2 | U | D1_0 | D1_1 | D1_2 | D1_3 |
| | | | T | D1_4 | D1_5 | D1_6 | D1_7 |

Invalid data

Copy

Invalid data

Copy

| Write destination area | | | | 0 | | | | | 1 | | | |
|---|---|---|---|---|---|---|---|---|---|---|---|---|
| LBN | | | | 0 | 1 | 2 | 3 | 4 | 5 | 6 | 7 | |
| PBN | | | | 0 | 1 | 2 | 3 | 4 | 5 | 6 | 7 | |
| WL0 | SU0 | WRT1 | L | D0_0 | D0_1 | D0_2 | D0_3 | D1_0 | D1_1 | D1_2 | D1_3 | |
| | | | M | D0_4 | D0_5 | D0_6 | D0_7 | D1_4 | D1_5 | D1_6 | D1_7 | |
| | | WRT2 | U | | | | | | | | | |
| | | | T | | | | | | | | | |
| | SU1 | WRT1 | L | D2_0 | D2_1 | D2_2 | D2_3 | D3_0 | D3_1 | D3_2 | D3_3 | |
| | | | M | D2_4 | D2_5 | D2_6 | D2_7 | D3_4 | D3_5 | D3_6 | D3_7 | |
| | | WRT2 | U | | | | | | | | | |
| | | | T | | | | | | | | | |
| WL1 | SU0 | WRT1 | L | ☆ | | | | | | | | |
| | | | M | | | | | | | | | |
| | | WRT2 | U | | | | | | | | | |
| | | | T | | | | | | | | | |
| | SU1 | WRT1 | L | | | | | | | | | |
| | | | M | | | | | | | | | |
| | | WRT2 | U | | | | | | | | | |
| | | | T | | | | | | | | | |

Read operation

MLC buffer

| | 0 | 1 | 2 | 3 |
|---|---|---|---|---|
| U | D2_7 | D3_0 | D3_1 | D3_2 |
| T | D3_3 | D3_4 | D3_6 | D3_7 |

| D··· | : Valid data |
|---|---|
| D··· | : Invalid data |
| | : Read target address |
| ☆ | : Write pointer |

F I G. 28

F I G. 29

MLC buffer

| | 0 | 1 | 2 | 3 |
|---|---|---|---|---|
| U | D9_6 | D9_5 | D9_4 | Unused |
| T | D9_2 | D9_1 | D9_0 | |

MLC buffer

| | 0 | 1 | 2 | 3 |
|---|---|---|---|---|
| U | D8_7 | D8_6 | D8_5 | D8_4 |
| T | D8_3 | D8_2 | D8_1 | D8_0 |

Data assignment

| Write destination area | | | | | 0 | | | | 1 | | | |
|---|---|---|---|---|---|---|---|---|---|---|---|---|
| LBN | | | | | | | | | | | | |
| PBN | | | 0 | 1 | 2 | 3 | 4 | 5 | 6 | 7 | | |
| WL0 | SU0 | WRT1 | L | D0_0 | D0_1 | D0_2 | D0_3 | D1_0 | D1_1 | D1_2 | | |
| | | | M | D0_4 | D0_5 | D0_6 | D0_7 | D1_4 | D1_5 | D1_6 | Defective BLK | |
| | | WRT2 | U | D3_7 | D3_6 | D3_4 | D3_3 | D2_4 | D2_3 | D2_1 | | |
| | | | T | D3_2 | D3_1 | D3_0 | D2_7 | D1_7 | D1_6 | D1_5 | | |
| | SU1 | WRT1 | L | D2_0 | D2_1 | D2_2 | D2_3 | D3_0 | D3_1 | D3_2 | | |
| | | | M | D2_4 | D2_5 | D2_6 | D2_7 | D3_4 | D3_5 | D3_6 | | |
| | | WRT2 | U | D10_0 | D10_1 | D10_2 | D10_3 | | | | | |
| | | | T | D10_4 | D10_5 | D10_6 | D10_7 | | | | | |
| WL1 | SU0 | WRT1 | L | PD | PD | PD | PD | PD | PD | PD | | |
| | | | M | PD | PD | PD | PD | PD | PD | PD | | |
| | | WRT2 | U | | | | | | | | | |
| | | | T | | | | | | | | | |
| | SU1 | WRT1 | L | D8_0 | D8_1 | D8_2 | D8_3 | D9_0 | D9_1 | D9_2 | | |
| | | | M | D8_4 | D8_5 | D8_6 | D8_7 | D9_4 | D9_5 | D9_6 | | |
| | | WRT2 | U | | | | | | | | | |
| | | | T | | | | | | | | | |

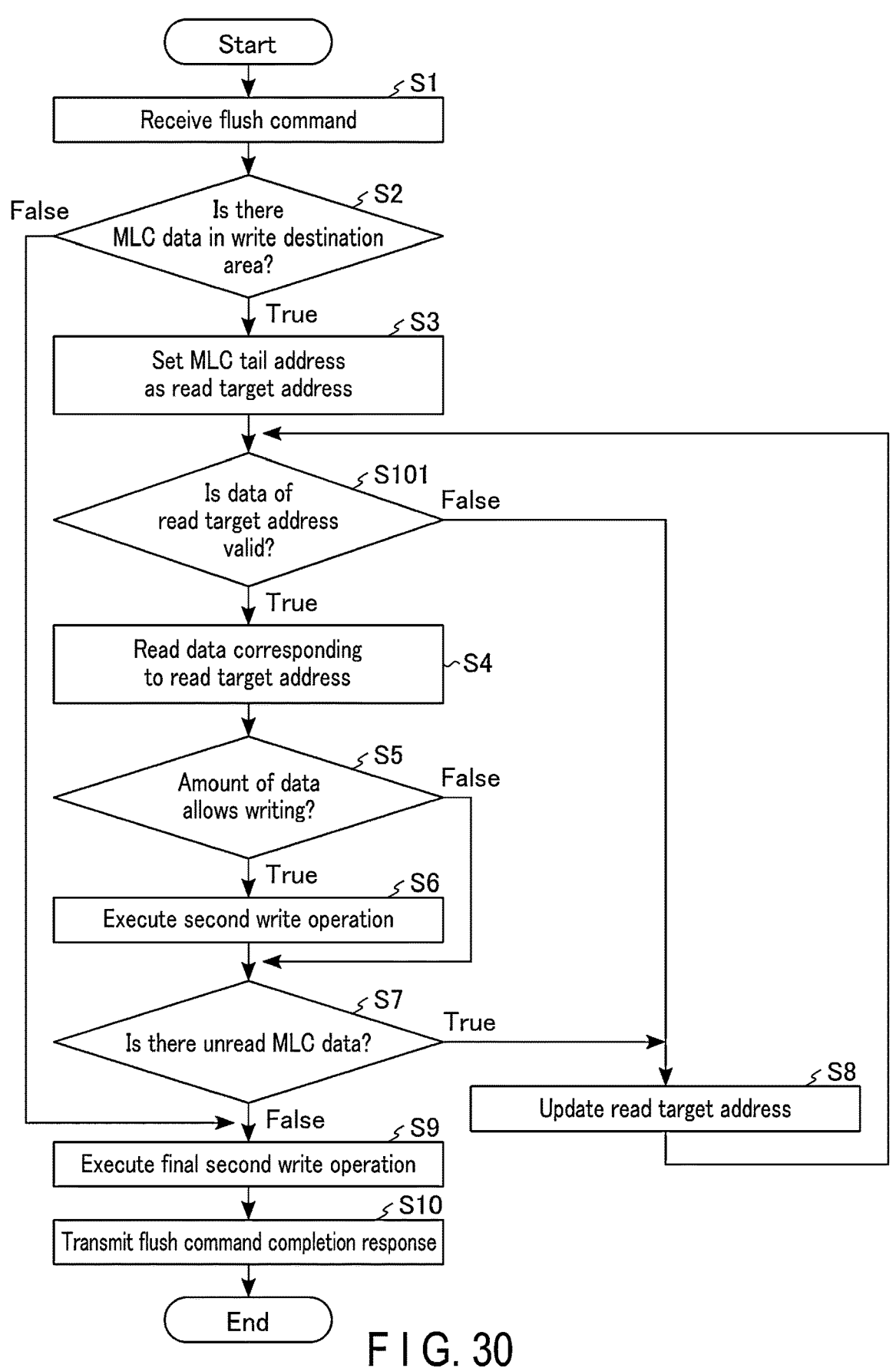
F I G. 30

MEMORY SYSTEM EXECUTING FLUSH COMMAND AND METHOD OF CONTROLLING NONVOLATILE MEMORY UPON RECEIVING FLUSH COMMAND

CROSS-REFERENCE TO RELATED APPLICATIONS

This application is based upon and claims the benefit of priority from Japanese Patent Application No. 2023-149407, filed Sep. 14, 2023, the entire contents of which are incorporated herein by reference.

FIELD

Embodiments described herein relate generally to a memory system and a method of controlling a nonvolatile memory.

BACKGROUND

As a memory system, a solid state drive (SSD), which includes a nonvolatile memory such as a NAND flash memory, is known.

BRIEF DESCRIPTION OF THE DRAWINGS

FIG. 1 is a block diagram showing an example of the overall configuration of an information processing system including a memory system according to a first embodiment.

FIG. 2 is a block diagram showing the basic configuration of a memory chip included in the memory system according to the first embodiment.

FIG. 3 is a circuit diagram showing an example of the circuit configuration of a memory cell array included in the memory system according to the first embodiment.

FIG. 4 is a view showing threshold voltage distributions and data assignment to memory cells included in the memory system according to the first embodiment.

FIG. 5 is a sequence diagram showing an example of a write operation in the memory system according to the first embodiment.

FIG. 6 is a diagram showing a change of the threshold voltage distributions of the memory cells by a first write operation performed in the memory system according to the first embodiment.

FIG. 7 is a diagram showing a change of the threshold voltage distributions of the memory cells by a second write operation performed in the memory system according to the first embodiment.

FIG. 8 is a diagram showing an example of a relationship between a look-up table and a write destination area included in the memory system according to the first embodiment.

FIG. 9 is a diagram showing an example of the order in which the first write operation and the second write operation are executed in the memory system according to the first embodiment.

FIG. 10 is a conceptual diagram showing an example of the write destination area before and after a protection operation is performed in the memory system according to the first embodiment.

FIG. 11 is a diagram showing a change of the look-up table before and after the protection operation is performed in the memory system according to the first embodiment.

FIG. 12 is a flowchart illustrating the overall flow of the protection operation performed in the memory system according to the first embodiment.

FIG. 13 is a flowchart illustrating a procedure example of the second write operation performed in the memory system according to the first embodiment.

FIG. 14 is a flowchart illustrating another procedure example of the second write operation performed in the memory system according to the first embodiment.

FIG. 15 is a diagram showing a specific example of an order in which a read target address is updated in the memory system according to the first embodiment.

FIG. 16 is a diagram showing a first specific example of the state of data stored in the write destination area and an MLC buffer in the memory system according to the first embodiment.

FIG. 17 is a diagram showing a second specific example of the state of data stored in the write destination area and the MLC buffer in the memory system according to the first embodiment.

FIG. 18 is a diagram showing a third specific example of the state of data stored in the write destination area and the MLC buffer in the memory system according to the first embodiment.

FIG. 19 is a diagram showing a fourth specific example of the state of data stored in the write destination area and the MLC buffer in the memory system according to the first embodiment.

FIG. 20 is a diagram showing a fifth specific example of the state of data stored in the write destination area and the MLC buffer in the memory system according to the first embodiment.

FIG. 21 is a diagram showing a sixth specific example of the state of data stored in the write destination area and the MLC buffer in the memory system according to the first embodiment.

FIG. 22 is a diagram showing a seventh specific example of the state of data stored in the write destination area and the MLC buffer in the memory system according to the first embodiment.

FIG. 23 is a diagram showing an eighth specific example of the state of data stored in the write destination area and the MLC buffer in the memory system according to the first embodiment.

FIG. 24 is a diagram showing a ninth specific example of the state of data stored in the write destination area and the MLC buffer in the memory system according to the first embodiment.

FIG. 25 is a diagram showing a tenth specific example of the state of data stored in the write destination area and the MLC buffer in the memory system according to the first embodiment.

FIG. 26 is a conceptual diagram showing an example of a write destination area before and after a protection operation performed in a memory system according to a modification of the first embodiment.

FIG. 27 is a diagram showing a first specific example of the state of data stored in a write destination area and an MLC buffer in a memory system according to a second embodiment.

FIG. 28 is a diagram showing a second specific example of the state of data stored in the write destination area and the MLC buffer in the memory system according to the second embodiment.

FIG. 29 is a diagram showing a specific example of the state of data stored in a write destination area and an MLC buffer in a memory system according to a third embodiment.

FIG. 30 is a flowchart showing the overall flow of a protection operation performed in a memory system according to a fourth embodiment.

DETAILED DESCRIPTION

In general, according to one embodiment, a memory system includes a nonvolatile memory including a plurality of memory cells and a memory controller electrically coupled to the nonvolatile memory. Each of the plurality of memory cells is configured to store, in a nonvolatile manner, a plurality of bits of data including at least a first bit and a second bit. The plurality of memory cells include at least a first memory cell and a second memory cell different from the first memory cell. The memory controller is configured to, in a case where the first memory cell stores valid first bit data as the first bit and does not store data as the second bit, and the second memory cell stores valid second bit data as the first bit and does not store data as the second bit, and upon reception of a flush command from a host, read the second bit data from the second memory cell and write the second bit data read from the second memory cell to the first memory cell as the second bit.

A description will now be given of embodiments with reference to the accompanying drawings. The drawings are schematic. In the description below, structural elements having the same functions and configurations will be denoted by the same reference symbols. The numbers after the letters of each reference symbol are used to distinguish between elements that have a similar structure.

A memory system according to embodiments will be described below.

1 First Embodiment 1.1 Configuration
1.1.1 Configuration of Information Processing System First, a description will be given of an example of the configuration of an information processing system 1 with reference to FIG. 1. FIG. 1 is a block diagram showing an example of the overall configuration of the information processing system 1.

As shown in FIG. 1, the information processing system 1 includes a host 2 and a memory system 3.

The host 2 is an information processing apparatus (computing device) that accesses the memory system 3. The host 2 controls the memory system 3. More specifically, for example, the host 2 requests (instructs) the memory system 3 to execute a write operation or a read operation of data (to be referred to as user data hereinafter). For example, a write request includes a write command, a logical address, and user data. The host 2 also transmits a flush command to the memory system 3. The flush command is a command that instructs the memory system 3 to guarantee (protect) valid user data received by the memory system 3 up to the point of receiving the flush command. For example, the memory system 3 executes a save operation and a protection operation as operations corresponding to the flush command. The save operation is an operation of writing (saving) data that has been received by the memory system 3 and that has not been stored in the nonvolatile memory 10 (e.g., volatile data stored in a buffer memory 25) to a nonvolatile memory 10. The protection operation is an operation of nonvolatilizing (protecting) data that has been stored in the nonvolatile memory 10 and that has not been made completely nonvolatilized. Once protection target data is made nonvolatilized through the save and protection operations, any write failures that may occur in a write operation after the operation corresponding to the flush command is completed (after the flush command completion response), or any destruction (loss) of the protection target data due to power outages, are prevented.

The memory system 3 is, for example, a solid state drive (SSD). The memory system 3 includes the nonvolatile memory 10 and a memory controller 20. The memory system 3 is coupled to the host 2 via a host bus. The type of the host bus depends on an application applied to the memory system 3. In a case where the memory system 3 is an SSD, the host bus complies with, for example, a peripheral component interconnect express (PCIe™) standard.
1.1.2 Configuration of Memory System Next, a description will be given of an example of the memory system 3.

The nonvolatile memory 10 is a nonvolatile storage medium. The nonvolatile memory 10 stores data received from the memory controller 20 in a nonvolatile manner. A description will be given of a case where the nonvolatile memory 10 is a NAND flash memory. Note that the nonvolatile memory 10 may be a nonvolatile storage medium other than the NAND flash memory.

The memory controller 20 is, for example, a system-on-a-chip (SoC). The memory controller 20 manages the memory space of the nonvolatile memory 10. In response to a request (instruction) from the host 2, the memory controller 20 instructs the nonvolatile memory 10 to perform a read operation, a write operation, etc. Upon reception of a flush command from the host 2, the memory controller 20 executes the protection operation for data that has not been made nonvolatilized. The protection operation will be described later. Upon completion of the data protection operation, the memory controller 20 transmits to the host 2 a response (referred to as a flush command completion response) indicating that the operation based on the flush command has been completed.

Next, a description will be given of an example of the internal configuration of the nonvolatile memory 10. The nonvolatile memory 10 includes one or more memory chips 11. For example, in a case where the nonvolatile memory 10 includes a plurality of memory chips 11, each of the plurality of memory chips 11 can operate independently. Note that the number of memory chips 11 included in the nonvolatile memory 10 can be freely determined.

The memory chip 11 is, for example, a semiconductor chip including a NAND flash memory. The memory chip 11 includes a plurality of memory cell transistors (to be also referred to as memory cells hereinafter) that store data in a nonvolatile manner. The memory chip 11 is coupled to the memory controller 20 (specifically, to a NAND controller 27) via a NAND bus.

Next, a description will be given of an example of the internal configuration of the memory controller 20. The memory controller 20 includes a host interface circuit (host I/F) 21, a central processing unit (CPU) 22, a read only memory (ROM) 23, a random access memory (RAM) 24, the buffer memory 25, an error check and correction (ECC) circuit 26, and the NAND controller 27. These circuits are coupled to each other via an internal bus. Note that some or all of the functions of the host interface circuit 21, ECC circuit 26, and NAND controller 27 may be realized by dedicated circuits, or may be realized by the CPU 22 executing firmware.

The host interface circuit 21 is an interface circuit to be coupled to the host 2. The host interface circuit 21 performs communications between the host 2 and the memory controller 20. The host interface circuit 21 transmits requests and user data received from the host 2 to the CPU 22 and the buffer memory 25, respectively. Furthermore, the host interface circuit 21 transmits user data stored in the buffer memory 25 to the host 2, based on an instruction of the CPU 22.

The CPU 22 is a processor. The CPU 22 controls the operation of the entire memory controller 20. For example, the CPU 22 instructs the nonvolatile memory 10 to perform a write operation and a read operation, based on requests of the host 2.

Further, the CPU 22 executes the save operation and the protection operation for data, based on the flush command. Note that in the description below, explanation of the save operation will be omitted.

For example, the memory controller 20 of the present embodiment divisionally writes multi-bit data to a memory cell in two steps including a first write operation and a second write operation. Data that is stored in the memory cell for which the first write operation has been executed but the second write operation has not been executed, is data that has not yet been made completely nonvolatilized. In other words, the data that has not yet been made completely nonvolatilized is data in which some of the bits have been written to the memory cell and some other bits have not been written to the memory cell. In the protection operation, data that is stored in the nonvolatile memory 10 and that has not been made completely nonvolatilized is protected. More specifically, in a first memory area which is being selected as a write destination and includes a memory cell in which some bits of data have not been written, or in a second memory area which can be selected as a write destination and includes a memory cell which stores data that has not been made completely nonvolatilized (hereinafter the first and second memory areas are collectively referred to as a write destination area), the CPU 22 writes valid data, which has not been made completely nonvolatilized, to a memory cell in which another data that has not been made completely nonvolatilized. That is, in the write destination area, the CPU 22 moves (copies) data that has not been completely made nonvolatilized to a memory cell. Thus, the CPU 22 completes the nonvolatilization (protection) of the data that has been copied to the memory cell.

The ROM 23 is a nonvolatile memory. For example, the ROM 23 is an electrically erasable programmable read-only memory (EEPROM™). The ROM 23 is a non-temporary storage medium that stores firmware, programs, etc. For example, the CPU 22 loads firmware from the ROM 23 into the RAM 24 and executes it.

The RAM 24 is a volatile memory. The RAM 24 is a dynamic random access memory (DRAM), a static random access memory (SRAM), or the like. The RAM 24 stores firmware for managing the nonvolatile memory 10, and various management tables. For example, the RAM 24 stores a look-up table (LUT) as a management table. The look-up table is a table which the memory controller 20 uses for managing user data stored in the nonvolatile memory 10. The look-up table will be described later.

The buffer memory 25 is a volatile memory. The buffer memory 25 is a DRAM, an SRAM, or the like. The buffer memory 25 temporarily stores read data which the memory controller 20 reads from the nonvolatile memory 10, user data received from the host 2, etc. For example, the buffer memory 25 includes an MLC buffer 251.

The MLC buffer 251 temporarily stores data that is read from the nonvolatile memory 10 in the protection operation.

The ECC circuit 26 is a circuit that executes ECC processing. The ECC processing includes data encoding processing and data decoding processing. For example, in the write operation, the ECC circuit 26 performs encoding processing of user data to generate an error correction code. The ECC circuit 26 generates write data by adding the error correction code to the user data. Furthermore, the ECC circuit 26 executes decoding processing in the read operation. That is, the ECC circuit 26 performs error correction of data read from the nonvolatile memory 10 using the error correction code. For example, in the case of the protection operation, the ECC circuit 26 may perform error correction of data stored in the MLC buffer 25 that has been read from the nonvolatile memory, or may perform error correction of data read from the nonvolatile memory 10 and cause the MLC buffer 251 to store data obtained after the error correction.

The NAND controller 27 controls the nonvolatile memory 10. For example, one NAND controller 27 can control a plurality of memory chips 11. The memory controller 20 includes one or more NAND controllers 27. In the example shown in FIG. 1, the memory controller 20 includes two NAND controllers 27. The NAND controller 27 transmits a command corresponding to a write operation, a read operation, an erase operation, or the like to the memory chip 11. In the read operation, the NAND controller 27 receives read data from the memory chip 11.

1.1.3 Configuration of Memory Chip

Next, an example of the configuration of the memory chip 11 will be described with reference to FIG. 2. FIG. 2 is a block diagram showing an example of the basic configuration of the memory chip 11. Note in the example shown in FIG. 2, some of the couplings between the constituent elements are indicated by arrow lines. Needless to say, the couplings between the constituent elements are not limited to the example shown in FIG. 2.

As shown in FIG. 2, the memory chip 11 transmits and receives a signal DQ and timing signals DQS and DQSn to and from the memory controller 20 (more specifically, the NAND controller 27) via a NAND bus. The signal DQ is, for example, data DAT, an address ADD, or a command CMD. The timing signals DQS and DQSn are timing signals used at the time of input and output of the data DAT. The timing signal DQSn is the inverted signal of the timing signal DQS.

The memory chip 11 receives various kinds of control signals from the memory controller 20 via the NAND bus. In addition, the memory chip 11 transmits a ready/busy signal RBn to the memory controller 20 via the NAND bus. The ready/busy signal RBn is a signal indicating whether the memory chip 11 cannot receive a command CMD from the memory controller 20 (busy state) or can receive it (ready state).

Next, the internal configuration of the memory chip 11 will be described. The memory chip 11 includes an input/output circuit 101, a logic control circuit 102, an address register 103, a command register 104, a sequencer 105, a ready/busy circuit 106, and one or more planes PLN. Each plane PLN includes a memory cell array 111, a row decoder 112, a sense amplifier 113, a data register 114, and a column decoder 115.

The input/output circuit 101 is a circuit that inputs and outputs the signal DQ. The input/output circuit 101 is coupled to the memory controller 20. Further, the input/output circuit 101 is coupled to the logic control circuit 102, the address register 103, the command register 104, and the data register 114 of each plane PLN.

If the input signal DQ is an address ADD, the input/output circuit 101 transmits the address ADD to the address register 103. If the input signal DQ is a command CMD, the input/output circuit 101 transmits the command CMD to the command register 104.

If the input signal DQ is data DAT, the input/output circuit 101 receives the input signal DQ, based on the timing signals DQS and DQSn. The input/output circuit 101 then transmits the data DAT to the data register 114 of the corresponding plane PLN, based on the address ADD stored in the address register 103. In addition, the input/output circuit 101 outputs the data DAT to the memory controller 20 as an output signal DQ together with the timing signals DQS and DQSn.

The logic control circuit 102 is a circuit that performs logic control, based on the control signals. The logic control circuit 102 is coupled to the memory controller 20. In addition, the logic control circuit 102 is coupled to the input/output circuit 101 and the sequencer 105. The logic control circuit 102 receives the various kinds of control signals from the memory controller 20. The logic control circuit 102 controls the input/output circuit 101 and the sequencer 105, based on the received control signals.

The address register 103 is a register that temporarily stores the address ADD. The address register 103 is coupled to the input/output circuit 101 and to the row decoder 112 and the column decoder 115 of each plane PLN. The address ADD includes a row address RA and a column address CA. The address register 103 transfers the row address RA to the row decoder 112. Also, the address register 103 transfers the column address CA to the column decoder 115.

The command register 104 is a register that temporarily stores the command CMD. The command register 104 is coupled to the input/output circuit 101 and the sequencer 105. The command register 104 transfers the command CMD to the sequencer 105.

The sequencer 105 is a circuit that controls the entire memory chip 11. More specifically, the sequencer 105 controls the ready/busy circuit 106, and the row decoder 112, the sense amplifier 113, the data register 114, and the column decoder 115 of each plane PLN. The sequencer 105 executes a read operation, a write operation, an erase operation, etc., based on the command CMD.

The ready/busy circuit 106 is a circuit that generates the ready/busy signal RBn. The ready/busy circuit 106 is coupled to the memory controller 20. Further, the ready/busy circuit 106 is coupled to the sequencer 105. The ready/busy circuit 106 transmits to the memory controller 20, the ready/busy signal RBn that is based on an operating status of the sequencer 105.

The plane PLN is a unit that performs the write operation and the read operation. In the example shown in FIG. 2, the memory chip 11 includes four planes PLN0, PLN1, PLN2, and PLN3. Note that the number of planes PLN included in the memory chip 11 is not limited to four. The planes PLN0 to PLN3 can operate independently of each other. Also, the planes PLN0 to PLN3 can operate in parallel. In other words, the memory chip 11 has one or more planes PLN that can be controlled independently of each other.

Next, the internal configuration of the plane PLN will be described. In the description below, reference will be made to a case where the planes PLN0 to PLN3 have the same configuration. Note that the planes PLN may have different configurations each other.

The memory cell array 111 is a group of a plurality of memory cells arranged in a matrix. The memory cell array 111 includes a plurality of blocks BLK. In the example shown in FIG. 2, the memory cell array 111 includes four blocks BLK0, BLK1, BLK2, and BLK3. Note that the number of blocks BLK included in the memory cell array 111 is not limited to four. The block BLK is, for example, a group of a plurality of memory cells whose data is erased collectively at one time. That is, the block BLK is a unit of an erase operation. Details of the configuration of the block BLK will be described later.

The row decoder 112 is a decoding circuit for the row address RA. The row decoder 112 is coupled to the address register 103, the sequencer 105, and the memory cell array 111. The row decoder 112 selects one of the blocks BLK of the memory cell array 111, based on the decoding result of the row address RA. The row decoder 112 applies voltages to row-direction interconnects (i.e., to word lines and select gate lines described later) of the selected block BLK.

The sense amplifier 113 is a circuit that writes and reads data DAT. The sense amplifier 113 is coupled to the sequencer 105, the memory cell array 111, and the data register 114. The sense amplifier 113 reads data DAT from the memory cell array 111 during the read operation. Further, the sense amplifier 113 supplies voltages corresponding to data DAT to the memory cell array 111 during the write operation. The sense amplifier 113 includes a plurality of latch circuits for temporarily storing data.

The data register 114 is a register that temporarily stores data DAT. The data register 114 is coupled to the input/output circuit 101, the sense amplifier 113, and the column decoder 115. The data register 114 includes a plurality of latch circuits. Each latch circuit temporarily stores data received from the input/output circuit 101 or data received from the sense amplifier 113.

The column decoder 115 is a circuit that decodes the column address CA. The column decoder 115 is coupled to the address register 103 and the data register 114. The column decoder 115 receives the column address CA from the address register 103. The column decoder 115 selects the latch circuits in the data register 114, based on the decoding result of the column address CA.

1.1.4 Circuit Configuration of Memory Cell Array

Next, a description will be given of an example of the circuit configuration of the memory cell array 111 with reference to FIG. 3. FIG. 3 is a circuit diagram showing an example of the circuit configuration of the memory cell array 111.

The block BLK includes a plurality of string units SU. In the example shown in FIG. 3, the block BLK includes five string units SU0 to SU4. Note that the number of string units SU included in the block BLK can be freely determined. The string unit SU is, for example, a group of a plurality of NAND strings NS.

The NAND string NS is a group of a plurality of memory cells coupled in series. Each of the plurality of NAND strings NS of the string unit SU is coupled to one of bit lines BL0 to BLm (m is an integer of 1 or larger). Each NAND string NS includes a plurality of memory cells MC and select transistors ST1 and ST2. In the example shown in FIG. 3, the NAND string NS includes eight memory cells MC0 to MC7.

The memory cell MC is a memory element that stores data in a nonvolatile manner. The memory cell MC includes a control gate and a charge accumulation layer. The memory cell MC may be either a metal-oxide-nitride-oxide-silicon (MONOS) type or a floating gate (FG) type.

The select transistors ST1 and ST2 are switching elements. The select transistors ST1 and ST2 are used for selecting a string unit SU during various operations.

In the NAND string NS, the current paths of the select transistor ST2, the memory cells MC0 to MC7, and the select transistor ST1 are coupled in series. The drain of the select transistor ST1 is coupled to the bit line BL. The source of the select transistor ST2 is coupled to a source line SL.

In the same block BLK, the control gates of the memory cells MC0 to MC7 of different string units SU are commonly coupled to word lines WL0 to WL7, respectively. More specifically, for example, each of the string units SU0 to SU4 includes a plurality of memory cells MC0. The control gates of the plurality of memory cells MC0 in the block BLK are coupled to one word line WL0. This holds true of the other memory cells MC1 to MC7 as well.

The gates of the plurality of select transistors ST1 in each string unit SU are commonly coupled to one select gate line SGD. More specifically, the gates of the plurality of select transistors ST1 in the string unit SU0 are commonly coupled to a select gate line SGD0. The gates of the plurality of select transistors ST1 in the string unit SU1 are commonly coupled to a select gate line SGD1. The gates of the plurality of select transistors ST1 in the string unit SU2 are commonly coupled to a select gate line SGD2. The gates of the plurality of select transistors ST1 in the string unit SU3 are commonly coupled to a select gate line SGD3. The gates of the plurality of select transistors ST1 in the string unit SU4 are commonly coupled to a select gate line SGD4.

The gates of the plurality of select transistors ST2 in the block BLK are commonly coupled to a select gate line SGS.

The word lines WL0 to WL7, the select gate lines SGD0 to SGD4, and the select gate line SGS are coupled to the row decoder 112.

The bit lines BL are commonly coupled to one NAND string NS in each of the plurality of string units SU of each block BLK. Each bit line BL is coupled to the sense amplifier 113.

The source line SL is shared, for example, by the plurality of blocks BLK.

A set of the plurality of memory cells MC coupled to a common word line WL in one string unit SU will be referred to, for example, as a cell unit CU. In other words, the cell unit CU is a set of the plurality of memory cells MC collectively selected in the write operation or the read operation. A page is a unit of data that is collectively written to the cell unit CU (or collectively read therefrom). For example, if the memory cell MC stores 1-bit data, the storage capacity of the cell unit CU is 1 page. That is, the cell unit CU stores one page data. Note that the cell unit CU can have a storage capacity of two or more pages, based on the number of bits of data to be stored in each memory cell MC.

In the description below, reference will be made to a case where the memory cell MC is a quad level cell (QLC) that stores 4-bit data, although the memory cell MC is not limited to the QLC. For example, the memory MC may be a multi level cell (MLC) that stores 2-bit data, a triple level cell (TLC) that stores 3-bit data, or a penta level cell (PLC) that stores 5-bit data.

1.2 Threshold Voltage Distribution of Memory Cell

Next, a description will be given of an example of threshold voltage distributions of the memory cells MC with reference to FIG. 4. FIG. 4 is a view showing threshold voltage distributions and data assignment in a case where the memory cells MC are the QLC.

As shown in FIG. 4, if the memory cell MC stores 4-bit data, the threshold voltages have 16 distributions. These 16 threshold voltage distributions will be referred to as S0 to an S15 states in the ascending order of the threshold voltage.

Voltages V1 to V15 are verify voltages that are used for verify operations of the S0 to S15 states in the write operation. Voltage VREAD is a voltage that is applied to the non-selected word lines WL in the read operation. In a case where the voltage VREAD is applied to the gate, the memory cell MC is turned on regardless of the data stored therein. The relationship among the voltages V1 to V15 and the voltage VREAD is given by $V1<V2<V3<V4<V5<V6<V7<V8<V9<V10<V11<V12<V13<V14<V15<VREAD$.

The S0 state corresponds to the erased state of the memory cell MC. The S1 to S15 states each correspond to a state in which electric charges are injected into the charge accumulation layer of the memory cell MC and data is written. The threshold voltage of the memory cell MC included in the S0 state is lower than the voltage V1. The threshold voltages of the memory cells MC included in the S1 to S14 states are respectively equal to or higher than the voltage V1 and lower than the voltage V2, to, equal to or higher than the voltage V14 and lower than the voltage V15. The threshold voltage of the memory cell MC in the S15 state is equal to or higher than the voltage V15 and lower than the voltage VREAD.

The value set for the verify voltage and the value set for the read voltage corresponding to each state may be identical or may be different. To simplify the explanation, a description will be given of a case where the verify voltage and the read voltage have the same value.

In the description below, read operations using the voltages V1 to V15 will be referred to as read operations R1 to R15, respectively. The read operation R1 determines whether the threshold voltage of the memory cell MC is lower than the voltage V1. The read operation R2 determines whether the threshold voltage of the memory cell MC is lower than the voltage V2. The read operation R3 determines whether the threshold voltage of the memory cell MC is lower than the voltage V3. This holds true of the other read operations. As described above, the threshold voltage of each memory cell MC belongs to one of the 16 threshold voltage distributions. Thus, each memory cell MC can be in 16 types of states. By assigning "0000" to "1111" data in binary notation to these states, each memory cell MC can store 4-bit data. In the description below, the bits of 4-bit data will be sequentially referred to as a lower bit, a middle bit, an upper bit, and a top bit in the order from the lowest bit. Additionally, a set of lower bits stored in the memory cells MC included in the same cell unit CU will be referred to as lower page data, a set of middle bits will be referred to as middle page data, a set of upper bits will be referred to as upper page data, and a set of top bits will be referred to as top page data.

In the example shown in FIG. 4, data of lower bit/middle bit/upper bit/top bit are assigned to the memory cells MC included in the respective states, as follows.

S0 state: "1111" data
S1 state: "1110" data
S2 state: "1100" data
S3 state: "1101" data
S4 state: "1001" data
S5 state: "1011" data
S6 state: "0011" data
S7 state: "0010" data
S8 state: "1010" data
S9 state: "1000" data
S10 state: "0000" data
S11 state: "0001" data
S12 state: "0101" data S13 state: "0111" data S14 state: "0110" data S15 state: "0100" data In a case where data assigned in the above manner is read, the lower bit is determined by the read operations R6, R8 and R10. The middle bit is determined by the read operations R4 and R12. The upper bit is determined by the read operations R2, R5, R9, R13 and R15. The top bit is determined by the read operations R1, R3, R7, R11 and R14. That is, the values of the lower bit, the middle bit, the upper bit, and the top bit are determined by three, two, five, and five read operations, respectively. In the description below, this data assignment will be referred to as a 3-2-5-5 code. Note that the data assignment to the S0 to S15 states is not limited to the 3-2-5-5 code.

1.3 Write Operation

Next, a description will be given of a write operation. The write operation includes a program operation and a program verify operation. By repeating the combination of the program operation and the program verify operation (to be hereinafter referred to as a program cycle), the threshold voltage of each memory cell MC is raised up to a target level.

The program operation is an operation of raising the threshold voltage by injecting electric charges into the charge accumulation layer (or an operation of maintaining the threshold voltage by inhibiting the injection).

The program verify operation is an operation of reading data from the memory cell MC after the program operation and determining whether the threshold voltage of the memory cell MC has reached the target level. For the memory cell MC whose threshold voltage has reached the target level, the injection of electric charges is inhibited in the subsequent program cycles.

In the present embodiment, the write operation to one cell unit CU is divisionally executed twice. More specifically, a write operation of four page data to the cell unit CU is divisionally executed twice as a first-time write operation of lower page data and middle page data (to be hereinafter referred to as a first write operation) and as a second-time write operation of upper page data and top page data (to be hereinafter referred to as a second write operation). Note that the write operation to one cell unit CU may be divisionally executed three or more times.

1.3.1 First Write Operation

First, the first write operation will be described with reference to FIG. 5 and FIG. 6. FIG. 5 is a sequence chart showing an example of the write operation. FIG. 6 is a diagram showing a change of the threshold voltage distributions of memory cells MC as a result of the first write operation. Note that in FIG. 5, the program verify operation is omitted.

As shown in FIG. 5, the memory controller 20 causes the sequencer 105 to execute the first write operation. First, the memory controller 20 transmits lower page data and middle page data to the memory chip 11 (referred to as a data-in operation). The sequencer 105 causes the latch circuits of the sense amplifier 113 (and the data register 114) to temporarily store the lower page data and the middle page data.

Next, the sequencer 105 executes the first write operation. More specifically, the sequencer 105 writes the lower page data and the middle page data in the target cell unit CU of the memory cell array 111.

As shown in FIG. 6, as a result of the first write operation, the threshold voltage of each memory cell MC belongs to one of four threshold voltage distributions. The four threshold voltage distributions will be hereinafter referred to as M0 state, M1 state, M2 state, and M3 state in the ascending order of threshold voltage. Data of lower bit/middle bit are assigned to the memory cells MC in the respective states, as follows:

M0 state: "11" data

M1 state: "10" data

M2 state: "00" data

M3 state: "01" data

The M0 state includes the memory cells MC that are to transition to the so state to the S3 state by the second write operation to be described later. The M1 state includes the memory cells MC that are to transition to the S4 state, the S5 state, the S8 state, and the S9 state by the second write operation. The M2 state includes the memory cells MC that are to transition to the S6 state, the S7 state, the S10 state, and the S11 state by the second write operation. The M3 state includes the memory cells MC that are to transition to the S12 state to the S15 state by the second write operation.

The sequencer 105 uses voltages VM1, VM2, and VM3 as verify voltages in the first write operation. The voltage VM1 is a verify voltage used to write the M1 state ("10" data). The voltage VM1 is equal to or higher than the voltage V1 and lower than the voltage V4. The voltage VM2 is a verify voltage used to write the M2 state ("00" data). The voltage VM2 is equal to or higher than the voltage V4 and lower than the voltage V6. The voltage VM3 is a verify voltage used to write the M3 state ("01" data). The voltage VM3 is equal to or higher than the voltage V6 and lower than the voltage V12. The threshold voltage of the memory cells MC included in the M0 state is lower than the voltage V1. The threshold voltage of the memory cells MC included in the M1 state is equal to or higher than the voltage VM1 and lower than the voltage V5. The threshold voltage of the memory cells MC included in the M2 state is equal to or higher than the voltage VM2 and lower than the voltage V7. The threshold voltage of the memory cells MC included in the M3 state is equal to or higher than the voltage VM3 and lower than the voltage V13.

In the description below, the state of the cell unit CU for which the first write operation has been executed but the second write operation has not been executed will be referred to as an MLC state or an intermediate stage of the write operation. Lower page data and middle page data are written to the cell unit CU in the MLC state, but upper page data and top page data are not written. In this case, the lower page data and the middle page data will collectively be referred to as MLC data or intermediate data of the write operation.

1.3.2 Second Write Operation

Next, the second write operation will be described with reference to FIG. 5 and FIG. 7. FIG. 7 is a diagram showing a change of the threshold voltage distributions of memory cells MC as a result of the second write operation.

As shown in FIG. 5, the memory controller 20 causes the sequencer 105 to execute the second write operation. First, the memory controller 20 transmits upper page data and top page data to the memory chip 11 (referred to as a data-in operation). The sequencer 105 causes the latch circuits of the sense amplifier 113 (and the data register 114) to temporarily store the upper page data and the top page data.

Next, the sequencer 105 executes the second write operation. More specifically, the sequencer 105 first reads the lower page data and the middle page data from the corresponding cell unit CU of the memory cell array 111, and causes the latch circuits of the sense amplifier 113 (and the data register 114) to temporarily store them. Next, the sequencer 105 executes the write operation of the upper page data and the top page data to the target cell unit CU, based on the lower page data, middle page data, upper page data, and top page data stored in the latch circuits of the sense amplifier 113 (and the data register 114). Note that the sequencer 105 may transmit the lower page data and middle page data to the memory controller 20 in order to perform error correction of the read lower page data and middle page data. In this case, the memory controller 20 causes the ECC circuit 26 to execute decoding processing and encoding processing of the lower page data and middle page data. Thus, the ECC circuit 26 generates corrected lower page data and middle page data. The memory controller 20 transmits the corrected lower page data and middle page data to the memory chip 11, as well as the upper page data and the top page data.

As shown in FIG. 7, 16 threshold voltage distributions are formed by the second write operation. For example, by the second write operation, each memory cell MC belonging to the threshold voltage distribution of the M0 state is made to belong to one of the threshold voltage distributions of the S0 to S3 states. Each memory cell MC belonging to the threshold voltage distribution of the M1 state is made to belong to one of the threshold voltage distributions of the S4, S5, S8, and S9 states. Each memory cell MC belonging to the threshold voltage distribution of the M2 state is made to belong to one of the threshold voltage distributions of the S6, S7, S10, and S11 states. Each memory cell MC belonging to the threshold voltage distribution of the M3 state is made to belong to one of the threshold voltage distributions of the S12 to S15 states.

For example, a memory cell MC that belongs to the threshold voltage distribution of the M0 state and stores data "11" is made to belong to the threshold voltage distribution of the S3 state by the second write operation, and as a result, that memory cell MC stores data "1101."

For example, a memory cell MC that belongs to the threshold voltage distribution of the M1 state and stores data "10" is made to belong to the threshold voltage distribution of the S4 state by the second write operation, and as a result, that memory cell MC stores data "1001."

For example, a memory cell MC that belongs to the threshold voltage distribution of the M2 state and stores data "00" is made to belong to the threshold voltage distribution of the S7 state by the second write operation, and as a result, that memory cell MC stores data "0010."

For example, a memory cell MC that belongs to the threshold voltage distribution of the M3 state and stores data "01" is made to belong to the threshold voltage distribution of the S14 state by the second write operation, and as a result, that memory cell MC stores data "0110."

1.3.3 Relationship Between Look-Up Table and Write Destination Area

Next, a description will be given of an example of a relationship between the look-up table LUT and the write destination area with reference to FIG. 8. FIG. 8 is a diagram showing an example of the relationship between the look-up table LUT and the write destination area. The upper table in FIG. 8 shows the look-up table LUT. The lower table in FIG. 8 shows data stored in the write destination area, the data corresponding to the look-up table LUT of the upper table in FIG. 8. In the write destination area, one square frame corresponds to one page data. WRT1 and WRT2 indicate areas written by the first write operation and the second write operation, respectively. L, M, U and T indicate lower page data, middle page data, upper page data, and top page data, respectively.

In the description below, a cell unit CU corresponding to both a word line WLi (i: an integer of 0 or larger) and a string unit SUj (j is an integer of 0 or larger) of a certain physical block (block BLK) will be referred to as a "cell unit CU_WLi_SUj." For example, the cell unit CU corresponding to the word line WL0 and the string unit SU0 is expressed as a cell unit CU_WL0_SU0.

As shown in FIG. 8, the look-up table LUT includes a plurality of entries each indexed by a logical cluster address number (LCAN). The logical cluster address number LCAN is an identification number of a logical cluster address. The logical cluster address is a logical address for identifying user data in units of clusters. The example in FIG. 8 shows a case where one page data is included in one cluster. Note that the cluster size can be freely determined. For example, one cluster may include a plurality of page data. Furthermore, one page data may be configured with a plurality of clusters.

Valid data means data associated with a certain logical cluster address number LCAN. For example, in the look-up table LUT, data associated with a logical cluster address number LCAN (more specifically, data stored at a physical address mapped to the logical cluster address number LCAN) is valid data and may be read by the host 2 later. Invalid data means data that is not associated with any logical cluster address number LCAN. The data that is not associated with any logical cluster address number LCAN is data that is no longer read by the host 2.

With respect to each entry, information on a logical block number LBN, a physical block number PBN, a word line WL, a string unit SU, and a page type PT are stored as a physical address that specifies a memory area of the non-volatile memory 10.

The logical block number LBN is an identification number of a logical block. The logical block is a group of blocks BLK. The logical block is also referred to as a super block.

The physical block number PBN is an identification number of a physical block, that is, block BLK. The example in FIG. 8 shows a case where four physical blocks (i.e., four blocks BLK) are assigned to one logical block. Note that the number of physical blocks assigned to one logical block can be freely determined. Write operations can be performed to the four physical blocks in parallel. For example, in a write operation performed for the four physical blocks, four cell units CU corresponding to the same word line WL and the same string unit SU are collectively selected. Four page data written to the four cell units CU can be collectively referred to as logical page data. In the present embodiment, the CPU 22 writes to the four physical blocks (four cell units CU) collectively, two page data (lower page data and middle page data) by the first write operation or two page data (upper page data and top page data) by the second write operation. That is, eight page data (two logical page data) corresponding to eight logical cluster address numbers LCAN are collectively written. Note that the execution timing at which the write operation is performed in the physical blocks may vary.

Blocks BLK included in different memory chips 11 may be assigned to a plurality of physical blocks corresponding to one logical block number LBN, or blocks BLK included in different planes PLN of one memory chip 11 may be assigned to them. In addition, these blocks may be used in combination.

The numbers of word lines WL and string units SU correspond to cell units CU that store data.

The page type PT indicates the type of page data in each cell unit CU.

The look-up table LUT is updated when a write operation of user data is performed. In addition, the look-up table LUT is updated if valid data is designated as invalid data by a trim command received from the host 2.

In the example shown in FIG. 8, in the entries of logical cluster address numbers LCAN0 to LCAN3 of the look-up table LUT, "0" is registered in the logical block number LBN item, and "0" to "3" are registered in the physical block number PBN item in this order. In addition, "0" (i.e., WL0) is registered in the word line WL item of the entries, "0" (i.e., SU0) is registered in the string unit SU item, and "Lower" is registered in the page type PT item. Four page data corresponding to the logical cluster address numbers LCAN0 to LCAN3 correspond to one logical page data.

In the entries of logical cluster address numbers LCAN4 to LCAN7 of the look-up table LUT, "0" is registered in the logical block number LBN item, and "0" to "3" are registered in the physical block number PBN item in this order. In addition, "0" is registered in the word line WL item of the entries, "0" is registered in the string unit SU item, and "Middle" is registered in the page type PT item. Four page data corresponding to the logical cluster address numbers LCAN4 to LCAN7 correspond to one logical page data.

Let it be assumed that page data to be written to the write destination area is expressed as data Dx_y (x is an integer of 0 or larger, and y is an integer not smaller than 0 and not larger than 7). The "x" of data Dx_y indicates the execution order of the write operations to the write destination area. The "y" of data Dx_y indicates an identifier of write data. For example, in a case where eight page data expressed as data D0_0 to D0_7 are to be written collectively, the CPU 22 refers to the look-up table LUT and executes the first write operation. More specifically, the CPU 22 selects cell unit CU_WL0_SU0 in each of the four physical blocks corresponding to logical block number LBN0 (physical block numbers PBN0 to PBN3). Then, the CPU 22 executes the first write operation and writes data D0_0 to D0_7 to the four cell units CU_WL0_SU0. At this time, data D0_0 to D0_3, which are lower page data, and data D0_4 to D0_7, which are middle page data, are written to the cell units CU_WL0_SU0 of the four physical blocks corresponding to physical block numbers PBN0 to PBN3. More specifically, data D0_0 and D0_4 are written to the cell unit CU_WL0_SU0 of the physical block corresponding to physical block number PBN0 as lower page data and middle page data, respectively. Data D0_1 and D0_5 are written to the cell unit CU_WL0_SU0 of the physical block corresponding to physical block number PBN1 as lower page data and middle page data, respectively. Data D0_2 and D0_6 are written to the cell unit CU_WL0_SU0 of the physical block corresponding to physical block number PBN2 as lower page data and middle page data, respectively. Data D0_3 and D0_7 are written to the cell unit CU_WL0_SU0 of the physical block corresponding to physical block number PBN3 as lower page data and middle page data, respectively.

1.3.4 Execution Order of First Write Operation and Second Write Operation

Next, an example of the execution order of the first write operation and the second write operation will be described with reference to FIG. 9. FIG. 9 is a diagram showing an example of the order in which the first write operation and the second write operation are executed. The example in FIG. 9 shows a case where logical blocks identified by two logical block numbers LBN0 and LBN1 are selected as a write destination area. That is, two logical blocks (eight physical blocks) corresponding to logical block numbers LBN0 and LBN1 belong to the write destination area. To simplify the description, the example in FIG. 9 shows a case where each block BLK includes only two string units SU0 and SU1.

As shown in FIG. 9, the CPU 22 first selects cell unit CU_WL0_SU0 in each of the four physical blocks corresponding to logical block number LBN0 (physical block numbers PBN0 to PBN3) as a zeroth data write destination. The CPU 22 executes the first write operation and writes data D0_0 to D0_3, which are lower page data, and data D0_4 to D0_7, which are middle page data, to the four cell units CU_WL0_SU0.

Next, the CPU 22 selects cell unit CU_WL0_SU0 in each of the four physical blocks corresponding to logical block number LBN1 (physical block numbers PBN4 to PBN7) as a first data write destination. The CPU 22 executes the first write operation and writes data D1_0 to D1_3, which are lower page data, and data D1_4 to D1_7, which are middle page data, to the four cell units CU_WL0_SU0.

Next, the CPU 22 selects cell unit CU_WL0_SU1 in each of the four physical blocks corresponding to logical block number LBN0 (physical block numbers PBN0 to PBN3) as a second data write destination. The CPU 22 executes the first write operation and writes data D2_0 to D2_3, which are lower page data, and data D2_4 to D2_7, which are middle page data, to the four cell units CU_WL0_SU1.

Next, the CPU 22 selects cell unit CU_WL0_SU1 in each of the four physical blocks corresponding to logical block number LBN1 (physical block numbers PBN4 to PBN7) as a third data write destination. The CPU 22 executes the first write operation and writes data D3_0 to D3_3, which are lower page data, and data D3_4 to D3_7, which are middle page data, to the four cell units CU_WL0_SU1.

Next, the CPU 22 selects cell unit CU_WL1_SU0 in each of the four physical blocks corresponding to logical block number LBN0 (physical block numbers PBN0 to PBN3) as a fourth data write destination. The CPU 22 executes the first write operation and writes data D4_0 to D4_3, which are lower page data, and data D4_4 to D4_7, which are middle page data, to the four cell units CU_WL1_SU0.

Next, the CPU 22 selects cell unit CU_WL1_SU0 in each of the four physical blocks corresponding to logical block number LBN1 (physical block numbers PBN4 to PBN7) as a fifth data write destination. The CPU 22 executes the first write operation and writes data D5_0 to D5_3, which are lower page data, and data D5_4 to D5_7, which are middle page data, to the four cell units CU_WL1_SU0.

Next, the CPU 22 selects cell unit CU_WL0_SU0 in each of the four physical blocks corresponding to logical block number LBN0 (physical block numbers PBN0 to PBN3) as a sixth data write destination. The CPU 22 executes the second write operation and writes data D6_0 to D6_3, which are upper page data, and data D6_4 to D6_7, which are top page data, to the four cell units CU_WL0_SU0.

Next, the CPU 22 selects cell unit CU_WL0_SU0 in each of the four physical blocks corresponding to logical block number LBN1 (physical block numbers PBN4 to PBN7) as a seventh data write destination. The CPU 22 executes the second write operation and writes data D7_0 to D7_3, which are upper page data, and data D7_4 to D7_7, which are top page data, to the four cell units CU_WL0_SU0.

Next, the CPU 22 selects cell unit CU_WL1_SU1 in each of the four physical blocks corresponding to logical block number LBN0 (physical block numbers PBN0 to PBN3) as an eighth data write destination. The CPU 22 executes the first write operation and writes data D8_0 to D8_3, which are lower page data, and data D8_4 to D8_7, which are middle page data, to the four cell units CU_WL1_SU1.

Next, the CPU 22 selects cell unit CU_WL1_SU1 in each of the four physical blocks corresponding to logical block number LBN1 (physical block numbers PBN4 to PBN7) as a ninth data write destination. The CPU 22 executes the first write operation and writes data D9_0 to D9_3, which are lower page data, and data D9_4 to D9_7, which are middle page data, to the four cell units CU_WL1_SU1.

For example, in the state shown in FIG. 9, in the eight physical blocks corresponding to physical block numbers PBN0 to PBN7, 24 cell units CU corresponding to a set of word line WL0 and string unit SU1, a set of word line WL1 and string unit SU0, and a set of word line WL1 and string unit SU1 are in the MLC state. That is, 48 pieces of data D2_0 to D2_7, D3_0 to D3_7, D4_0 to D4_7, D5_0 to D5_7, D8_0 to D8_7, and D9_0 to D9_7 are MLC data.

The CPU 22 sequentially selects logical block numbers LBN0 and LBN1 as a write destination, and selects cell unit CU corresponding to the same word line WL and the same string unit SU of each physical block of the selected logical block. Then, the CPU 22 sequentially selects logical block numbers LBN0 and LBN1 as a next write destination, and selects cell unit CU corresponding to a next word line WL or a next string unit SU of each physical block of the selected logical block.

Focusing on one string unit SU in a single physical block, the CPU 22 executes the first write operation for the cell unit CU corresponding to the first numbered word line WL (e.g., word line WL0), and then executes the first write operation for the cell unit CU corresponding to the second numbered word line WL (e.g., word line WL1). After the first write operation is completed in the cell unit CU corresponding to the second numbered word line WL (e.g., word line WL1), the CPU 22 executes the second write operation for the cell unit CU corresponding to the first numbered word line WL (e.g., word line WL0). After the second numbered word line WL (e.g., word line WL1), the CPU 22 selects cell units CU in a similar order.

For example, the CPU 22 manages the order of write operations by using a write pointer indicating the write operation to be performed next. In the example shown in FIG. 9, the CPU 22 sets the second write operation on the cell unit CU_WL0_SU1 of the physical block corresponding to physical block number PBN0 to be designated by the write pointer.

In the description below, among a plurality of page data, page data that is to be written earlier in the write sequence will be referred to as "former data," and page data that is to be written later in the write sequence will be referred to as "latter data." For example, data D0_*y*_is former data of data D1_*y*, and data D0_*y*_is former data of data D6_*y*. Among the eight page data for which a write operation is to be executed collectively, the middle page data is expressed as the latter data of the lower page data, the top page data is expressed as the latter data of the upper page data, and further data with a larger physical block number PBN is expressed as latter data. For example, among the data D0_0 to D0_7, data D0_0 is the foremost data, and data D0_7 is the last data. Among the data D6_0 to D6_7, data D6_0 is the foremost data, and data D6_7 is the last data.

The CPU 22 manages a physical address corresponding to middle page data, which is most recently written and in the MLC state (the last written middle page data), as an MLC tail address. In the example shown in FIG. 9, within the physical block corresponding to physical block number PBN7, the physical address of middle page data D9_7 written to cell unit CU_WL1_SU1 is set as the MLC tail address.

1.4 Protection Operation

Next, the protection operation will be described with reference to FIG. 10 and FIG. 11. FIG. 10 is a conceptual diagram showing an example of a write destination area before and after the protection operation. FIG. 11 is a diagram showing a change of the look-up table LUT before and after the protection operation. To simplify the description, the example in FIG. 10 and FIG. 11 shows a case where a logical block identified by logical block number LBN0 is selected as a write destination area. That is, the logical block (four physical blocks) corresponding to logical block number LBN0 belongs to the write destination area.

As shown in FIG. 10, for example, in the state before the reception of a flush command, data D0_0 to D0_3 as lower page data and data D0_4 to D0_7 as middle page data are written to the four cell units CU_WL0_SU0. In addition, data D1_0 to D1_3 as lower page data, and data D1_4 to D1_7 as middle page data are written to the four cell units CU_WL0_SU1. Data D0_0 to D0_7 and D1_0 to D1_7 are MLC data. A physical address corresponding to data D1_7 is set as the MLC tail address. The physical address corresponding to data D1_7 corresponds to logical cluster address number LCAN15. The second write operation to be performed for the cell unit CU_WL0_SU0 of the physical block corresponding to physical block number PBN0 is set as the target of a write pointer.

As shown in FIG. 11, data D0_0 to D0_7 correspond to logical cluster address numbers LCAN0 to LCAN7 in the look-up table LUT, respectively. Data D1_0 to D1_7 correspond to logical cluster address numbers LCAN8 to LCAN15 in the look-up table LUT, respectively.

In this state, it is assumed that the CPU 22 executes the protection operation upon reception of the flush command. The CPU 22 executes the second write operation for the write destination area, using the MLC data. More specifically, the CPU 22 copies latter MLC data as the upper page data and top page data of a cell unit CU to which former MLC data has been written. This completes the nonvolatilization of both the former MLC data and the latter MLC data simultaneously.

In the example shown in FIG. 10, the CPU 22 executes the second write operation and writes data D1_7 to D1_4 as upper page data, and data D1_3 to D1_0 as top page data, to the four cell units CU_WL0_SU0. At this time, the MLC data to be copied are read in order from the data D1_7 specified by the MLC tail address toward the former MLC data. In the example shown in FIG. 10, data D1_7, D1_6, D1_5, D1_4, D1_3, D1_2, D1_1, and D1_0 are read in this order. Therefore, the write order of data in the copy destination is just the opposite to the write order of data in the copy source. More specifically, data D1_7 and D1_3 are written to the cell unit CU_WL0_SU0 of the physical block corresponding to physical block number PBN0, as upper page data and top page data. Data D1_6 and D1_2 are written to the cell unit CU_WL0_SU0 of the physical block corresponding to physical block number PBN1, as upper page data and top page data. Data D1_5 and D1_1 are written to the cell unit CU_WL0_SU0 of the physical block corresponding to physical block number PBN2, as upper page data and top page data. Data D1_4 and D1_0 are written to the cell unit CU_WL0_SU0 of the physical block corresponding to physical block number PBN3, as upper page data and top page data.

As shown in FIG. 11, the CPU 22 updates the look-up table LUT before executing the second write operation. More specifically, the physical addresses corresponding to the data D1_0 to D1_7 (the physical addresses corresponding to the logical cluster address numbers LCAN8 to LCAN15) are changed to the physical addresses of the copy destination. As a result, the data D1_0 to D1_7 stored in the four cell units CU_WL0_SU1 are invalidated. The CPU 22 refers to the look-up table LUT and executes the second write operation.

1.4.1 Flow of Protection Operation

Next, an example of the flow of the protection operation will be described with reference to FIG. 12 to FIG. 14. FIG. 12 is a flowchart illustrating the overall flow of the protection operation. FIG. 13 is a flowchart illustrating details of step S6 shown in FIG. 12. FIG. 14 is a flowchart illustrating details of step S9 shown in FIG. 12.

First, the overall flow of the protection operation will be described.

As shown in FIG. 12, the CPU 22 starts the protection operation upon reception of a flush command from the host 2 (S1).

The CPU 22 checks whether there is MLC data in the write destination area (S2).

If there is no MLC data (S2_False), the CPU 22 transmits a flush command completion response to the host 2 (S10), and ends the protection operation.

If there is MLC data (S2_True), the CPU 22 sets the MLC tail address as a read target address of MLC data (S3).

The CPU 22 reads page data corresponding to the read target address from the nonvolatile memory 10 (S4). If the read data is valid data, the CPU 22 causes the MLC buffer 251 to store the read data.

The CPU 22 checks whether the amount of data stored in the MLC buffer 251 has reached the amount of data that allows execution of the second write operation (S5). For example, as described with reference to FIG. 8 and FIG. 9, eight page data are collectively written to four cell units CU in the present embodiment. In such a case, the MLC buffer 251 is configured such that it can store eight page data. The CPU 22 checks whether eight page data are stored in the MLC buffer 251.

If the amount of data stored in the MLC buffer 251 has reached the amount of data that allows execution of the second write operation (S5_True), the CPU 22 executes the second write operation using the data stored in the MLC buffer 251, as upper page data and top page data (S6).

If the amount of data stored in the MLC buffer 251 has not yet reached the amount of data that allows execution of the second write operation (S5_False), or after the second write operation of step S6 has been completed, the CPU 22 determines whether there is MLC data that has not yet been read (S7).

If there is MLC data that has not been read (S7_True), the CPU 22 updates the read target address (S8). More specifically, the CPU 22 changes the read target address to the physical address of former data that is one position ahead of the data of the current read target address. After the read target address is updated, the CPU 22 proceeds to step S4.

If there is no MLC data that are not read (S7_False), the CPU 22 executes a final second write operation using the data stored in the MLC buffer 251 (S9). After the final second write operation is completed, the CPU 22 transmits the flush command completion response to the host 2 (S10), and ends the protection operation.

Next, details of the second write operation executed in step S6 will be described.

As shown in FIG. 13, the CPU 22 first checks the write pointer (S61). As described with reference to FIG. 9, the execution order of the write operations is determined in advance. Therefore, depending on the timing at which the flush command is received, there may be a case where the next write operation is the first write operation. Therefore, the CPU 22 checks the write pointer and determines whether the next write operation is the second write operation.

If the next write operation is not the second write operation (S62_False), the CPU 22 executes the first write operation using padding data (dummy data) in step S63. The CPU 22 repeats the loop of steps S62 and S63 until the next write operation to be executed becomes the second write operation.

If the next write operation is the second write operation (S62_True), the CPU 22 executes the second write operation using the data stored in the MLC buffer 251 (S64). That is, the second write operation described with respect to step S6 is executed.

After the second write operation is executed, the CPU 22 updates the look-up table LUT (S65).

Next, details of the final second write operation executed in step S9 will be described.

As shown in FIG. 14, the CPU 22 first checks whether unwritten data remains in the MLC buffer 251 (S91).

If no data remains in the MLC buffer 251 (S92_False), the CPU 22 ends the final second write operation. That is, the final second write operation in step S9 is skipped.

If data remains in the MLC buffer 251 (S92_True), the CPU 22 checks the write pointer and determines whether the next write operation is the second write operation (S93).

If the next write operation is not the second write operation (S93_False), the CPU 22 executes the first write operation using padding data (dummy data) in step S94. The CPU 22 repeats the loop of steps S93 and S94 until the next write operation to be executed becomes the second write operation.

If the next write operation is the second write operation (S93_True), the CPU 22 checks whether the amount of data stored in the MLC buffer 251 has reached the amount of data that allows execution of the second write operation (S95).

If the amount of data stored in the MLC buffer 251 has not yet reached the amount of data that allows execution of the second write operation (S95_False), the CPU 22 fills the MLC buffer 251 with padding data such that the total of the amount of data stored in the MLC buffer 251 including the padding data becomes the amount that allows execution of the second write operation (S96). That is, the CPU 22 inserts padding data into empty areas of the MLC buffer 251.

If the amount of data stored in the MLC buffer 251 has reached the amount of data that allows execution of the second write operation (S95_True), or after the MLC buffer 251 is filled with padding data (S96), the CPU 22 executes the final second write operation using the data stored in the MLC buffer 251 (S97). That is, the final second write operation described with respect to step S9 is executed.

After the second write operation is executed, the CPU 22 updates the look-up table LUT (S98).

1.4.2 Specific Example of Update Order of Read Target Addresses

Next, a specific example of the update order of read target addresses will be described with reference to FIG. 15. FIG. 15 is a diagram showing a specific example of the update order of read target addresses. The example in FIG. 15 shows a case where a read target address is set for the state shown in FIG. 9.

As shown in FIG. 15, the read target addresses are set in an order from the last MLC data to the foremost MLC data. In the example shown in FIG. 15, there are 48 pieces of MLC data (lower page data or middle page data) for which read target addresses are set.

In this state, the MLC tail address is first set to the 0th (initial position) read target address. In the example shown in FIG. 15, the physical address of the middle page data stored in the cell unit CU_WL1_SU1 of the physical block corresponding to physical block number PBN7 is set as the 0th read target address.

Next, in the other three physical blocks collectively selected during the write operation, the physical addresses of the middle page data stored in the cell units CU_WL1_SU1 are sequentially set as 1st to 3rd read target addresses in the order of physical block numbers PBN6 to PBN4. Similarly, in the four physical blocks corresponding to physical block numbers PBN7 to PBN4, the physical addresses of the lower page data stored in the cell units CU_WL1_SU1 are sequentially set as 4th to 7th read target addresses in the order of the physical block numbers PBN7 to PBN4.

Similarly, 8th to 15th read target addresses are sequentially set for the cell units CU_WL1_SU1 of the four physical blocks corresponding to physical block numbers PBN3 to PBN0. Thereafter, 16th to 47th read target addresses are sequentially set using the same procedure. Note, however, that since the second write operation writes latter MLC data to cell units CU to which the former MLC data are written, all the 48 pieces of data are not necessarily set as the read target addresses. The CPU 22 may end updating the read target addresses if there is no more MLC data to read.

1.4.3 Specific Example of Protection Operation

Figure 17:
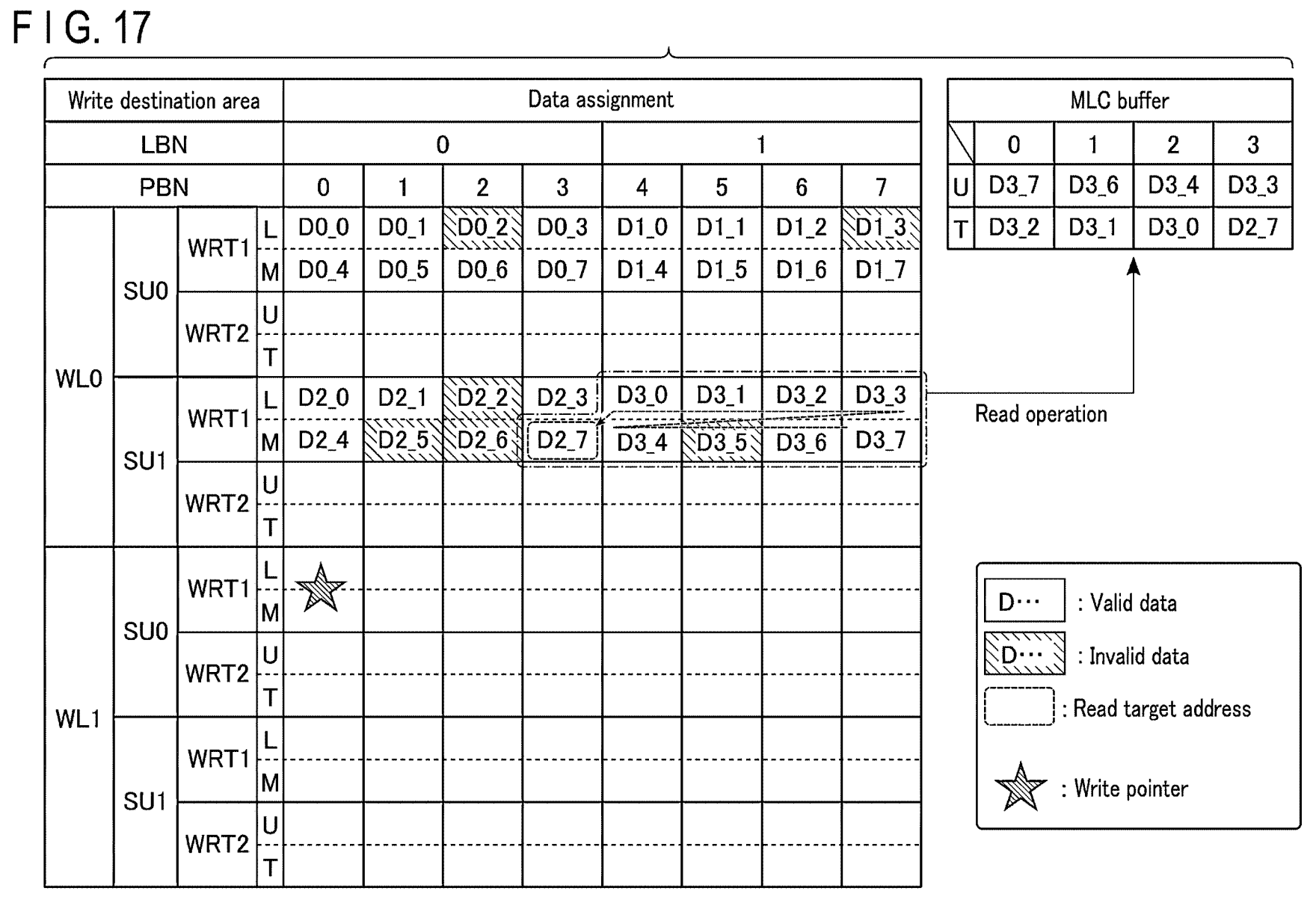

Next, a specific example of the protection operation will be described with reference to FIG. 16 to FIG. 25. FIG. 16 to FIG. 25 are diagrams showing specific examples of data stored in the write destination area and the MLC buffer 251.

As shown in FIG. 16, for example, data D0_0 to D3_7 are stored in the write destination area. In this case, data D0_0 to D0_7, D1_0 to D1_7, D2_0 to D2_7, and D3_0 to D3_7 are MLC data. The physical address of data D3_7 stored in cell unit CU_WL0_SU1 of the physical block corresponding to physical block number PBN7 is set as the MLC tail address. The first write operation to be performed for the cell unit CU_WL1_SU0 of the physical block corresponding to physical block number PBN0 is set as the write pointer. In the example shown in FIG. 16, data D0_2, D1_3, D2_2, D2_5, D2_6, and D3_5 are invalid data.

In this state, the CPU 22 starts the protection operation upon reception of a flush command. The CPU 22 reads the MLC tail address and sets it as the read target address.

As shown in FIG. 17, the CPU 22 sequentially reads data corresponding to the read target address while changing the read target address. The CPU 22 causes the MLC buffer 251 to store valid data included among the read data. In the example shown in FIG. 17, the CPU 22 sequentially reads data D3_7 to D3_0 and D2_7. The CPU 22 causes the MLC buffer 251 to store data D3_7, D3_6, D3_4, D3_3, D3_2, D3_1, D3_0, and D2_7, which are valid data included among the read data, in the order in which they are read. More specifically, data D3_7, D3_6, D3_4, and D3_3 are first stored in order in the buffers 0 to 3 corresponding to the upper page data of the MLC buffer 251. Next, data D3_2, D3_1, D3_0, and D2_7 are stored in order in the buffers 0 to 3 corresponding to the top page data of the MLC buffer 251.

In a case where eight page data are stored in the MLC buffer 251 and the second write operation becomes executable, the CPU 22 checks the write pointer. In the example shown in FIG. 17, the first write operation to be performed for the cell unit CU_WL1_SU0 of the physical block corresponding to physical block number PBN0 is set in the write pointer.

As shown in FIG. 18, the CPU 22 executes the first write operation using padding data PD until the next write operation to be executed becomes the second write operation. In the example shown in FIG. 18, the CPU 22 executes the first write operation and writes padding data PD to the cell units CU_WL1_SU0 of eight physical blocks corresponding to physical block numbers PBN0 to PBN7 as lower page data and middle page data. As a result, the second write operation to be performed for the cell unit CU_WL0_SU0 of the physical block corresponding to physical block number PBN0 is set as the next write pointer.

As shown in FIG. 19, the CPU 22 executes the second write operation and writes data in the MLC buffer 251 to the cell units CU_WL0_SU0 of the four physical blocks corresponding to physical block numbers PBN0 to PBN3, as upper page data and top page data. In the example shown in FIG. 19, data D3_7 and D3_2 are written to the cell unit CU_WL0_SU0 of the physical block corresponding to physical block number PBN0, as upper page data and top page data. Data D3_6 and D3_1 are written to the cell unit CU_WL0_SU0 of the physical block corresponding to physical block number PBN1, as upper page data and top page data. Data D3_4 and D3_0 are written to the cell unit CU_WL0_SU0 of the physical block corresponding to physical block number PBN2, as upper page data and top page data. Data D3_3 and D2_7 are written to the cell unit CU_WL0_SU0 of the physical block corresponding to physical block number PBN3, as upper page data and top page data.

After the second write operation is completed, the CPU 22 updates the look-up table LUT such that data D3_7, D3_6, D3_4, D3_3, D3_2, D3_1, D3_0 and D2_7 stored in the cell units CU_WL0_SU1 of the five physical blocks corresponding to physical block numbers PBN3 to PBN7 are invalidated. The data in the MLC buffer 251 are also invalidated. The second write operation to be performed for the cell unit CU_WL0_SU0 of the physical block corresponding to physical block number PBN4 is set as a next write pointer.

Figure 20:
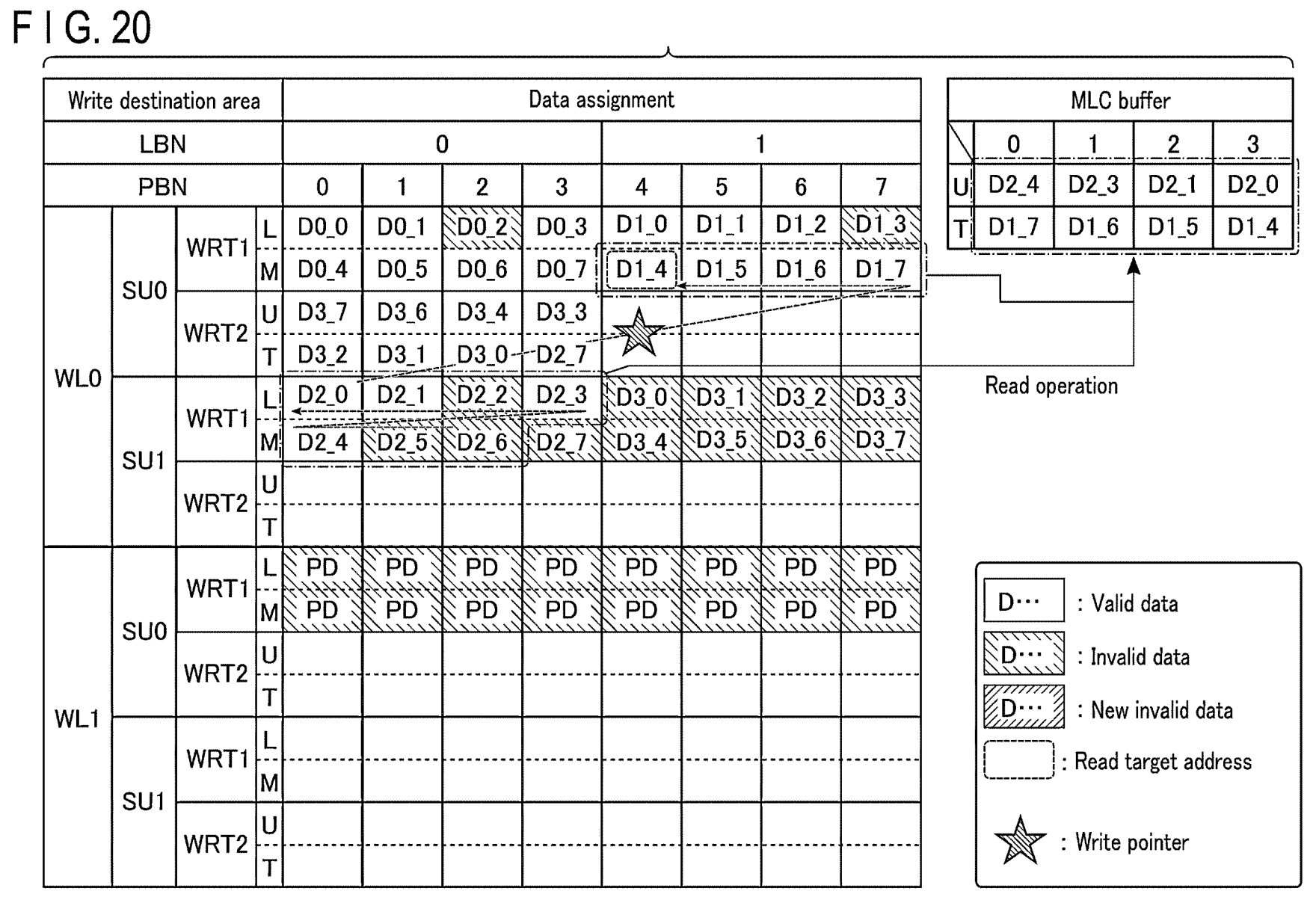

As shown in FIG. 20, in a case where valid MLC data that has not yet been read remains in the write destination area, the CPU 22 sequentially reads data corresponding to the read target address while changing the read target address. The CPU 22 causes the MLC buffer 251 to store valid data included among the read data. In the example shown in FIG. 20, the CPU 22 sequentially reads data D2_6 to D2_0 and D1_7 to D1_4. The CPU 22 causes the MLC buffer 251 to store data D2_4, D2_3, D2_1, D2_0, D1_7, D1_6, D1_5, and D1_4, which are valid data included among the read data, in the order in which they are read.

In a case where eight page data are stored in the MLC buffer 251 and the second write operation becomes executable, the CPU 22 checks the write pointer. In the example shown in FIG. 20, the second write operation to be performed for the cell unit CU_WL0_SU0 of the physical block corresponding to physical block number PBN4 is set in the write pointer.

As shown in FIG. 21, the CPU 22 executes the second write operation and writes data in the MLC buffer 251 to the cell units CU_WL0_SU0 of the four physical blocks corresponding to physical block numbers PBN4 to PBN7, as upper page data and top page data. In the example shown in FIG. 21, data D2_4 and D1_7 are written to the cell unit CU_WL0_SU0 of the physical block corresponding to physical block number PBN4, as upper page data and top page data. Data D2_3 and D1_6 are written to the cell unit CU_WL0_SU0 of the physical block corresponding to physical block number PBN5, as upper page data and top page data. Data D2_1 and D1_5 are written to the cell unit CU_WL0_SU0 of the physical block corresponding to physical block number PBN6, as upper page data and top page data. Data D2_0 and D1_4 are written to the cell unit CU_WL0_SU0 of the physical block corresponding to physical block number PBN7, as upper page data and top page data.

After the second write operation is completed, the CPU 22 updates the look-up table LUT such that data D2_4, D2_3, D2_1, D2_0, D1_7, D1_6, D1_5 and D1_4 in the write destination area are invalidated. The data in the MLC buffer 251 are also invalidated. The first write operation to be performed for the cell unit CU_WL1_SU1 of the physical block corresponding to physical block number PBN1 is set as the next write pointer.

Since valid MLC data that has not yet been read is not in the write destination area, the CPU 22 transmits the flush command completion response to the host 2 and ends the protection operation.

Next, a specific example of the final second write operation will be described.

As shown in FIG. 22, the CPU 22 executes the first write operation, for example, after the example shown in FIG. 21, such that data D8_0 to D8_3, which are lower page data, and data D8_4 to D8_7, which are middle page data, are written to the cell units CU_WL1_SU1 of the four physical blocks corresponding to physical block numbers PBN0 to PBN3. Next, the CPU 22 executes the first write operation and writes data D9_0 to D9_3 as lower page data and data D9_4 to D9_7 as middle page data to the cell units CU_WL1_SU1 of the four physical blocks corresponding to physical block number PBN4 to PBN7. Furthermore, the CPU 22 executes the second write operation such that data D10_0 to D10_3, which are upper page data, and data D10_4 to D10_7, which are top page data, are written to the cell units CU_WL0_SU1 of the four physical blocks corresponding to physical block numbers PBN0 to PBN3.

In this state, data D10_0 to D10_7, D8_0 to D8_7, D9_0 to D9_7, and padding data PD of eight cell units CU_WL1_SU0 are MLC data. The physical address of data D9_7 stored in the cell unit CU_WL1_SU1 of the physical block corresponding to physical block number PBN7 is set as the MLC tail address. The second write operation to be performed for the cell unit CU_WL0_SU1 of the physical block corresponding to physical block number PBN4 is set as the write pointer. In the example shown in FIG. 22, data D0_2, D1_3 to D1_7, D2_0 to D2_7, D3_0 to D3_7, D8_0 to D8_7, D9_0 to D9_3, and padding data PD are invalid data.

In this state, the CPU 22 starts the protection operation upon reception of a flush command. The CPU 22 sets the MLC tail address as the read target address.

As shown in FIG. 23, the CPU 22 sequentially reads data corresponding to the read target address while changing the read target address. The CPU 22 causes the MLC buffer 251 to store valid data included among the read data. In the example shown in FIG. 23, data D3_0 to D3_7, 16 pieces of padding data PD of the cell units CU_WL1_SU0, data D8_0 to D8_7, and data D9_0 to D9_7 are MLC data. Among these, data D3_0 is the foremost MLC data, and data D9_7 is the last MLC data. The CPU 22 sequentially executes the read operation from data D9_7, which is the last MLC data, to data D3_0, which is the foremost MLC data. The CPU 22 causes the MLC buffer 251 to store data D9_7, D9_6, D9_5, and D9_4, which are valid data included among the read data, in the order in which they are read. In this case, four page data are stored in the MLC buffer 251.

As shown in FIG. 24, the CPU 22 fills the MLC buffer 251 with padding data PD because the amount of data stored in the MLC buffer 251 has not reached the amount that allows execution of the second write operation.

Figure 25:
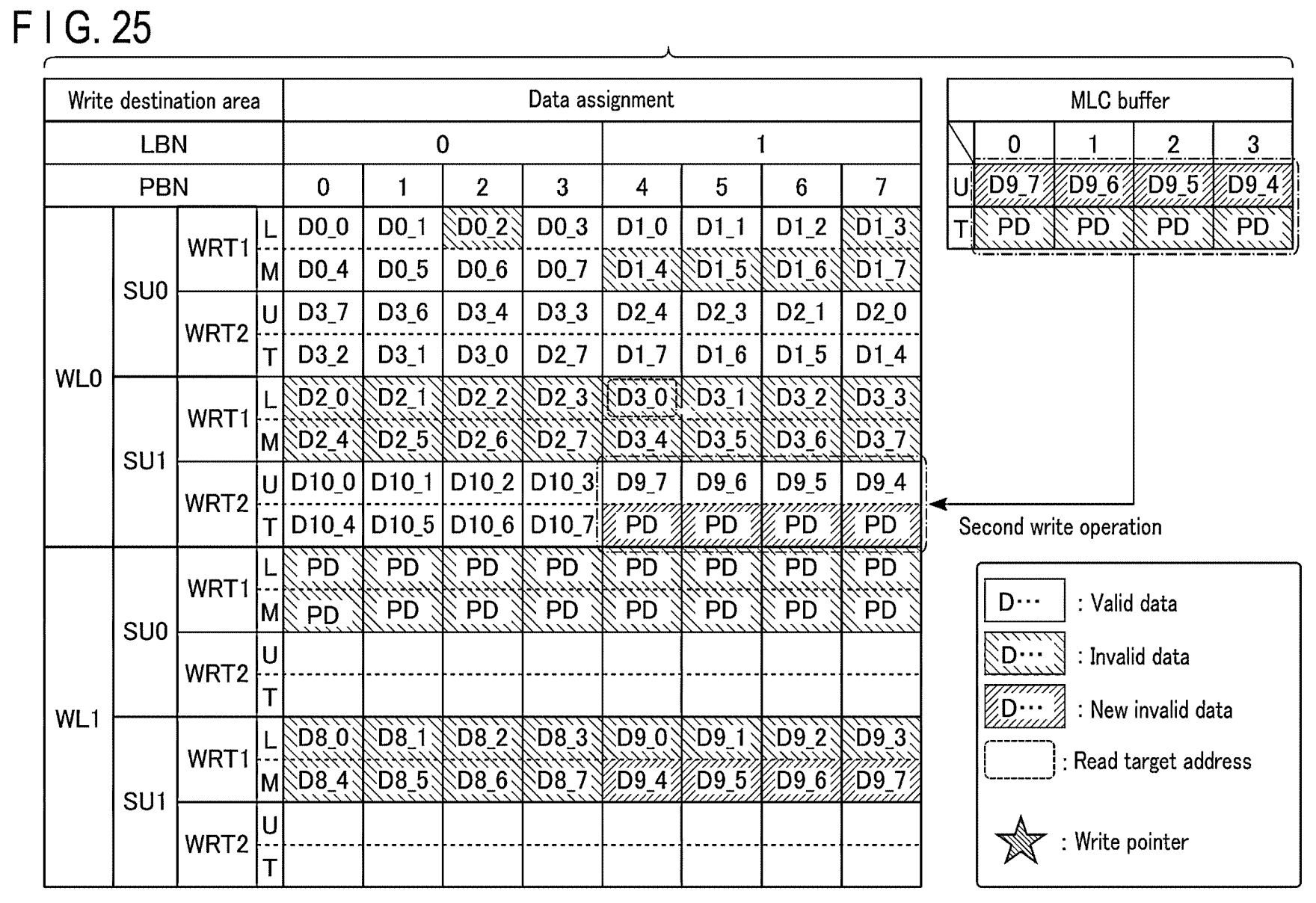

As shown in FIG. 25, the CPU 22 executes the second write operation and writes data in the MLC buffer 251 to the cell units CU_WL0_SU1 of the four physical blocks corresponding to physical block numbers PBN4 to PBN7, as upper page data and top page data. In the example shown in FIG. 25, data D9_7 and padding data PD are written to the cell unit CU_WL0_SU1 of the physical block corresponding to physical block number PBN4, as upper page data and top page data. Data D9_6 and padding data PD are written to the cell unit CU_WL0_SU1 of the physical block corresponding to physical block number PBN5, as upper page data and top page data. Data D9_5 and padding data PD are written to the cell unit CU_WL0_SU1 of the physical block corresponding to physical block number PBN6, as upper page data and top page data. Data D9_4 and padding data PD are written to the cell unit CU_WL0_SU1 of the physical block corresponding to physical block number PBN7, as upper page data and top page data.

After the second write operation is completed, the CPU 22 updates the look-up table LUT such that the data D9_4 to D9_7 stored in the cell units CU_WL1_SU1 of the four physical blocks corresponding to physical block numbers PBN4 to PBN7 are invalidated. The data in the MLC buffer 251 are also invalidated.

After the final second write operation is completed, the CPU 22 transmits the flush command completion response to the host 2, and ends the protection operation.

1.5 Advantages of Present Embodiment

With the configuration according to the present embodiment, a memory system with improved data reliability can be provided. This advantage will be described in detail.

In cases where multi-bit data are written to a memory cell, there is a method that performs a write operation in multiple steps. For example, in a write operation to a QLC, a first write operation of writing lower page data and middle page data, and a second write operation of writing upper page data and top page data are performed. In this case, if a write failure occurs in the second write operation or the power supply to the memory system stops during the second write operation, the MLC data (lower page data and middle page data) stored in a cell unit CU for which the second write operation is being executed may be destroyed.

For example, the host transmits a flush command to the memory system to ensure the latest values of data. Upon reception of the flush command from the host, the memory system executes processing to protect the MLC data. For example, in order to protect the MLC data, one conceivable idea is to write padding data as upper page data and top page data to the cell unit CU that stores the MLC data and then complete the write operation (second write operation). In this case, however, the write amplification factor (WAF) increases due to an increase in the amount of invalid data written to the memory cells.

In contrast, with the configuration according to the present embodiment, the memory system 3 can execute the protection operation upon reception of a flush command. In the protection operation, the memory system 3 can read latter MLC data from a certain cell unit CU of the write destination area, and can write them, as upper page data and top page data, to another cell unit CU that is in the same write destination area and that stores former MLC data. That is, the memory system 3 can execute the second write operation using the latter MLC data. This allows nonvolatilization (protection) of the MLC data. Therefore, the memory system 3 can improve data reliability.

Furthermore, with the configuration according to the present embodiment, latter MLC data can be written to a cell unit CU that stores former MLC data. That is, the nonvolatilization of both the latter MLC data and the former MLC data can be completed simultaneously. Therefore, the amount of MLC data to be copied (moved) can be reduced. Accordingly, it is possible to suppress the number of times the write operation is performed during the protection operation. In other words, it is possible to suppress an increase in the processing time of the protection operation. Therefore, the processing speed of the memory system 3 can be improved.

Furthermore, with the configuration according to the present embodiment, the memory system 3 can reduce the amount of MLC data to be moved. Therefore, an increase in the amount of invalid data written to memory cells can be suppressed. That is, an increase in the WAF can be suppressed.

1.6 Modification of First Embodiment

Next, a modification of the first embodiment will be described with reference to FIG. 26. FIG. 26 is a conceptual diagram showing an example of a write destination area before and after the protection operation. To simplify the description, the example in FIG. 26 shows a case where a logical block identified by logical block number LBN0 is selected as the write destination area, as in the case described with reference to FIG. 10.

As shown in FIG. 26, data D0_0 to D0_7 and D1_0 to D1_7 are written to the write destination area, as in the case described with reference to FIG. 10.

In this state, the CPU 22 executes the protection operation upon reception of a flush command. The CPU 22 executes the second write operation to copy lower page data to upper page data within the same cell unit CU, and copy middle page data to top page data within the same cell unit CU. At this time, the CPU 22 updates the look-up table LUT such that the copy-source lower page data and middle page data are invalidated. Note that the upper page data and top page data that have been copied may be invalidated. In this case, the update of the look-up table LUT is omitted.

2. Second Embodiment

Next, a description will be given of a second embodiment. The second embodiment differs from the first embodiment in the order in which data is stored in the MLC buffer 251. Hereinafter, a description will be given focusing on differences from the first embodiment.

2.1 Specific Example of MLC Buffer

Figure 28:
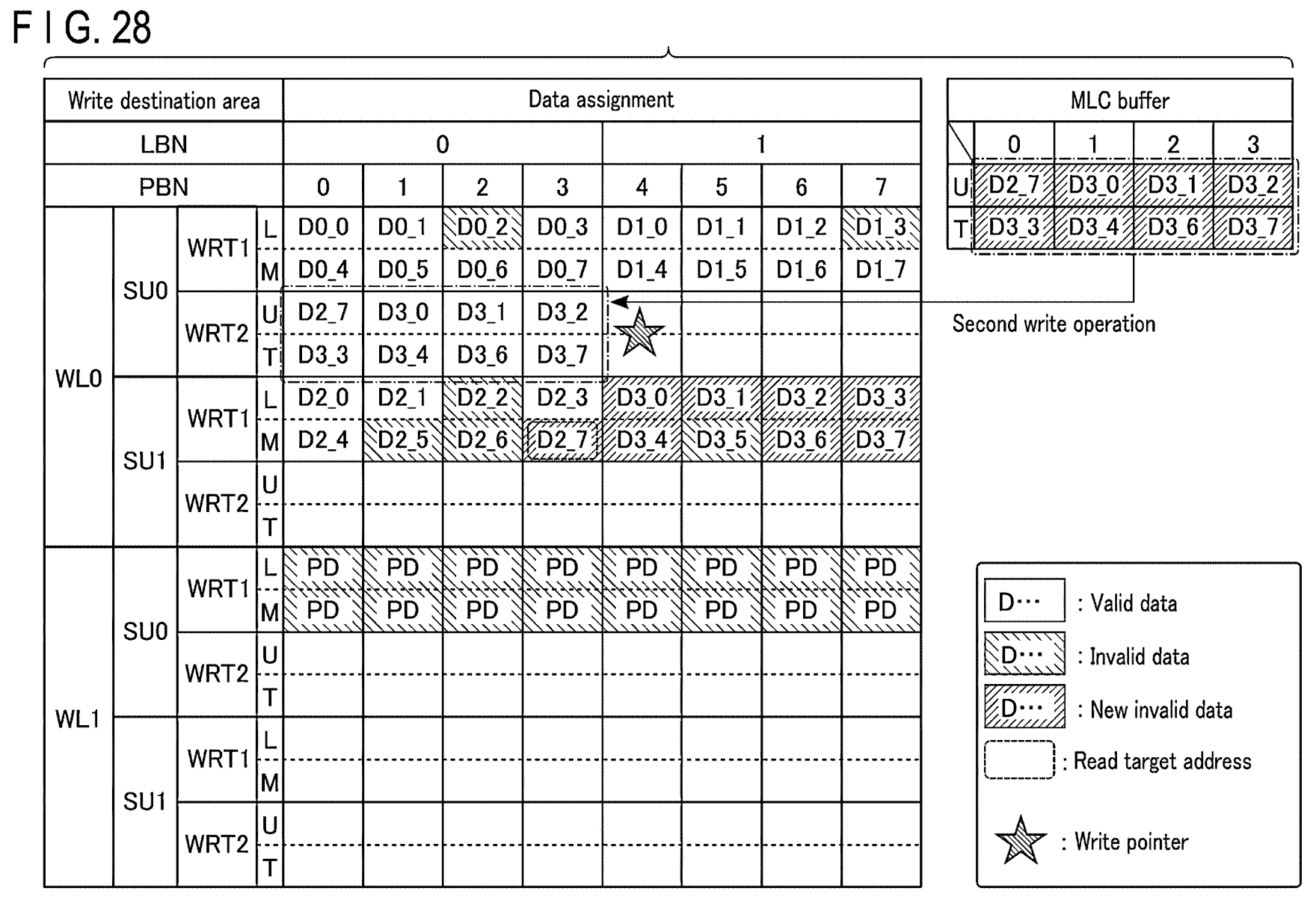

A specific example of the MLC buffer 251 will be described with reference to FIG. 27 and FIG. 28. FIG. 27 and FIG. 28 are diagrams showing specific examples of data stored in the write destination area and the MLC buffer 251. FIG. 27 corresponds to FIG. 17 referenced in connection with the first embodiment. FIG. 28 corresponds to FIG. 19 referenced in connection with the first embodiment.

In the present embodiment, the CPU 22 stores MLC data read from a write destination area in the order of buffers 3 to 0 corresponding to the top page data of the MLC buffer 251. Next, the CPU 22 stores MLC data read from the write destination area in the order of buffers 3 to 0 corresponding to the upper page data of the MLC buffer 251.

As shown in FIG. 27, the CPU 22 sequentially reads data D3_7 to D3_0 and D2_7. The CPU 22 causes the MLC buffer 251 to store data D3_7, D3_6, D3_4, D3_3, D3_2, D3_1, D3_0 and D2_7, which are valid data included among the read data. At this time, the buffer selection order of the MLC buffer 251 is reversed from the order described in connection with the first embodiment. More specifically, first, data D3_7, D3_6, D3_4 and D3_3 are sequentially stored in the order from the buffer 3 toward the buffer 0 corresponding to the top page data of the MLC buffer 251. Next, data D3_2, D3_1, D3_0 and D2_7 are sequentially stored in the order from the buffer 3 toward the buffer 0 corresponding to the upper page data of the MLC buffer 251. Thus, eight page data stored in the MLC buffer 251 can be selected as write data in the order from the foremost data.

As shown in FIG. 28, the CPU 22 executes the second write operation and writes data in the MLC buffer 251 to the cell units CU_WL0_SU0 of the four physical blocks corresponding to physical block numbers PBN0 to PBN3, as upper page data and top page data. In the example shown in FIG. 28, data D2_7 and D3_3 are written to the cell unit CU_WL0_SU0 of the physical block corresponding to physical block number PBN0, as upper page data and top page data. Data D3_0 and D3_4 are written to the cell unit CU_WL0_SU0 corresponding to physical block number PBN1, as upper page data and top page data. Data D3_1 and D3_6 are written to the cell unit CU_WL0_SU0 of the physical block corresponding to physical block number PBN2, as upper page data and top page data. Data D3_2 and D3_7 are written to the cell unit CU_WL0_SU0 of the physical block corresponding to physical block number PBN3, as upper page data and top page data.

Note that the data storing order to the MLC buffer 251 may be the same as that of the first embodiment. In this case, the CPU 22 can select write data in the order from the foremost data by reversing the order of reading data from the MLC buffer 251 from that of the first embodiment.

2.2 Advantages of Present Embodiment

With the configuration according to the present embodiment, the advantages similar to those of the first embodiment can be obtained.

Furthermore, with the configuration according to the present embodiment, the order of selecting data-storing buffers in the MLC buffer 251 can be reversed to that of the first embodiment.

For example, there is a case where pieces of data that are written to the write destination area before reception of a flush command are arranged optimally for sequential read. In such a case, if the order of data changes as a result of the protection operation, there is a possibility that the throughput of the read operation will deteriorate.

In contrast, with the configuration according to the present embodiment, the multiple page data stored in the MLC buffer 251 can be selected as write data in the order from the foremost data. Thus, it is possible to suppress a decrease in processing performance caused by changes in the data write order.

Note that the modification of the first embodiment and the present embodiment may be combined with each other.

3. Third Embodiment

Next, a description will be given of a third embodiment. In connection with the third embodiment, reference will be made to a case where physical blocks include defective blocks. Hereinafter, a description will be given focusing on the differences from the first and second embodiments.

3.1 Specific Example of MLC Buffer

A specific example of the MLC buffer 251 will be described with reference to FIG. 29. FIG. 29 is a diagram showing a specific example of data stored in a write destination area and the MLC buffer 251. In the description below, the second write operation using the MLC buffer 251 will be focused on.

In the present embodiment, the amount of data stored in the MLC buffer 251 is changed in accordance with the status of the physical blocks for which the second write operation is to be performed next. That is, in a case where the physical blocks includes a defective block BLK (i.e., unused block BLK), the corresponding buffer of the MLC buffer 251 is also made unused.

As shown in FIG. 29, for example, the physical block corresponding to physical block number PBN7 is a defective block BLK. The CPU 22 does not perform a write operation or a read operation on the defective block BLK.

In the protection operation, in a case where the second write operation is executed for logical block number LBN1 (physical block numbers PBN4 to PBN7) including the defective block BLK, the CPU 22 sets a buffer of the MLC buffer 251 corresponding to the defective block BLK in the unused state. Then, the CPU 22 causes the other buffers of the MLC buffer 251 to store six page data which are to be written to the three physical blocks corresponding to physical block numbers PBN4 to PBN6.

More specifically, in a case where the second write operation is executed for logical block number LBN1 (physical block numbers PBN4 to PBN7), the CPU 22 sets the buffer 3 of the MLC buffer 251 corresponding to the defective block BLK in the unused state. Then, the CPU 22 sequentially reads data D9_6 to D9_4 and D9_2 to D9_0 of the cell units CU_WL1_SU1 of the three physical blocks corresponding to physical block numbers PBN4 to PBN6, for example. At this time, the CPU 22 sequentially stores data D9_6, D9_5, and D9_4 in the buffers 0 to 2 corresponding to the upper page data of the MLC buffer 251. Next, the CPU 22 sequentially stores data D9_2, D9_1, and D9_0 in the buffers 0 to 2 corresponding to the top page data of the MLC buffer 251. The CPU 22 executes the second write operation and writes data D9_6 to D9_4 and D9_2 to D9_0 in the MLC buffer 251 to the cell units CU_WL0_SU1 of the three physical blocks corresponding to physical block numbers PBN4 to PBN6.

On the other hand, in a case where the second write operation is executed for logical block number LBN0 (physical block numbers PBN0 to PBN3), the CPU 22 sets the buffer 3 of the MLC buffer 251 in the usable state. Then, the CPU 22 sequentially reads data D8_7 to D8_0 of the cell units CU_WL1_SU1 of the four physical blocks corresponding to physical block numbers PBN0 to PBN3, for example. The CPU 22 sequentially stores data D8_7, D8_6, D8_5, and D8_4 in the buffers 0 to 3 corresponding to the upper page data of the MLC buffer 251. Next, the CPU 22 sequentially stores data D8_3, D8_2, D8_1, and D8_0 in the buffers 0 to 3 corresponding to the top page data of the MLC buffer 251. The CPU 22 executes the second write operation and writes data D8_7 to D8_0 in the MLC buffer 251 to the cell units CU_WL1_SU0 of the four physical blocks corresponding to physical block numbers PBN0 to PBN3.

3.2 Advantages of Present Embodiment

With the configuration of the present embodiment, the advantages similar to those of the first embodiment can be obtained.

Furthermore, with the configuration according to the present embodiment, the buffers of the MLC buffer 251 can be appropriately used if the write destination area includes a defective block BLK. Note that the present embodiment may be combined with the modification of the first embodiment or with the second embodiment.

4. Fourth Embodiment

Next, a description will be given of a fourth embodiment. In connection with the fourth embodiment, a description will be given of the overall flow of the protection operation, which is different from that of the first embodiment. Hereinafter, a description will be given focusing on differences from the first to third embodiments.

4.1 Flow of Protection Operation

Next, an example of the flow of the protection operation will be described with reference to FIG. 30. FIG. 30 is a flowchart showing the overall flow of the protection operation according to the present embodiment.

As shown in FIG. 30, the CPU 22 performs the operations from step S1 to step S3 in a similar manner to those described with reference to FIG. 12 of the first embodiment.

After setting the MLC tail address as the read target address of MLC data (S3), the CPU 22 checks whether the data corresponding to the read target address is valid data (S101). More specifically, the CPU 22 refers to the look-up table LUT to check whether the same physical address as the read target address is registered.

If the data corresponding to the read target address is valid data (S101_True), the CPU 22 reads page data corresponding to the read target address from the nonvolatile memory 10 (S4). The CPU 22 causes the MLC buffer 251 to store the read valid data.

If the data corresponding to the read target address is not valid data (S101_False), the CPU 22 updates the read target address (S8).

The operations after transitioning to step S5 are similar to those described with reference to FIG. 12 of the first embodiment.

4.2 Advantages of Present Embodiment

With the configuration of the present embodiment, the advantages similar to those of the first embodiment can be obtained.

Furthermore, with the configuration according to the present embodiment, read operations of invalid data can be omitted. Accordingly, it is possible to suppress an increase in the processing time of the read operation performed in the protection operation.

Note that the present embodiment may be combined with the modification of the first embodiment, with the second embodiment, or with the third embodiment.

5. Modifications

A memory system according to the above embodiments includes a nonvolatile memory (10) including a plurality of memory cells (MC) and a memory controller (20) electrically coupled to the nonvolatile memory. Each of the plurality of memory cells is configured to store, in a nonvolatile manner, a plurality of bits of data including at least a first bit (lower bit) and a second bit (upper bit). The plurality of memory cells include at least a first memory cell and a second memory cell different from the first memory cell. The memory controller is configured to, in a case where the first memory cell stores valid first bit data (D0_0 in FIG. 10) as the first bit and does not store data as the second bit, and the second memory cell stores valid second bit data (D1_3 in FIG. 10) as the first bit and does not store data as the second bit, and upon reception of a flush command from a host (2), read the second bit data from the second memory cell and write the second bit data read from the second memory cell to the first memory cell as the second bit.

With the embodiments above, it is possible to provide a memory system with improved data reliability.

The embodiments are not limited to the above-described ones, and various modifications can be made. In addition, the above embodiments can be combined wherever possible.

Note that "coupling" or "coupled" as used in the above embodiments includes a state where a transistor, a resistor or the like may be interposed between the coupled elements.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:

a nonvolatile memory including a plurality of memory cells, each of the plurality of memory cells being configured to store, in a nonvolatile manner, a plurality of bits of data including at least a first bit that is to be written by a first write operation and a second bit that is to be written by a second write operation, the plurality of memory cells including at least a first memory cell and a second memory cell different from the first memory cell; and a memory controller electrically coupled to the nonvolatile memory and configured to:

execute a data erase operation to the first memory cell resulting in the first memory cell storing no valid data as the first bit or the second bit;

execute a data erase operation to the second memory cell resulting in the second memory cell storing no valid data as the first bit or the second bit;

write first bit data to the first memory cell as the first bit by the first write operation; and write second bit data to the second memory cell as the first bit by the first write operation, wherein the memory controller is further configured to:

upon reception of a flush command from a host while the first memory cell stores the first bit data as the first bit and does not store valid data as the second bit, and the second memory cell stores the second bit data as the first bit and does not store valid data as the second bit, read the second bit data from the second memory cell; and write the second bit data read from the second memory cell to the first memory cell as the second bit.

2. The memory system according to claim 1, wherein the nonvolatile memory includes a plurality of memory areas, and at least one of the plurality of memory cells included in one of the plurality of memory areas of the nonvolatile memory to which the first memory cell and the second memory cell belong does not store data as the second bit.

3. The memory system according to claim 1, wherein the memory controller is further configured to:

write the second bit data to the second memory cell as the first bit after writing the first bit data to the first memory cell as the first bit; and upon the reception of the flush command from the host, read the second bit data from the second memory cell; and write the second bit data read from the second memory cell to the first memory cell as the second bit.

4. The memory system according to claim 1, wherein the nonvolatile memory includes a plurality of cell units, each of the plurality of cell units includes one or more of the plurality of memory cells, and the plurality of cell units include at least a first cell unit including the first memory cell and a second cell unit including the second memory cell, and the memory controller is further configured to:

read valid data that is stored as the first bit in each of the one or more memory cells of the second cell unit including at least the second memory cell; and upon a total amount of the valid data that are read from each of the one or more memory cells of the second cell unit after the reception of the flush command from the host having reached an amount of data that allows a write operation to be performed for the first cell unit, write the second bit data read from the second memory cell as the first bit to the first memory cell.

5. The memory system according to claim 4, wherein the memory controller is further configured to, in a case where the total amount of the valid data that are stored as the first bit in each of the one or more memory cells of the second cell unit at a point of time of the reception of the flush command from the host is less than the amount of data that allows the write operation to be performed for the first cell unit, write padding data to at least one of the memory cells of the first cell unit.

6. The memory system according to claim 4, wherein the nonvolatile memory further includes:

a first word line coupled to each of the plurality of memory cells included in the first cell unit;

a second word line coupled to each of the plurality of memory cells included in the second cell unit, the second word line being different from the first word line;

one or more first bit lines electrically coupled to the one or more of the plurality of memory cells included in the first cell unit; and one or more second bit lines electrically coupled to the one or more of the plurality of memory cells included in the second cell unit, the one or more second bit lines being different from the one or more first bit lines.

7. The memory system according to claim 1, further comprising:

a buffer, wherein the nonvolatile memory includes a plurality of cell units, each of the plurality of cell units includes one or more of the plurality of memory cells, and the plurality of cell units include at least a first cell unit including the first memory cell, and a second cell unit including the second memory cell, the memory controller is further configured to:

cause the buffer to store data read from the second cell unit, the data including at least the second bit data; and upon an amount of the data stored in the buffer having reached an amount of data that allows a write operation to be performed for the first cell unit, write the second bit data stored in the buffer to the first memory cell.

8. The memory system according to claim 7, wherein the memory controller is further configured to, in a case where the amount of the data stored in the buffer does not reach the amount of data that allows the write operation to be performed for the first cell unit, store padding data in the buffer and execute the write operation for the first cell unit, using the data stored in the buffer and the padding data stored in the buffer.

9. The memory cell according to claim 7, wherein the memory controller is further configured to:

read data from each of the one or more of the plurality of memory cells included in the second cell unit;

store valid data read from the second cell unit to the buffer; and skip storing invalid data read from the second cell unit to the buffer.

10. The memory system according to claim 1, wherein the plurality of memory cells further include a third memory cell and a fourth memory cell, and the memory controller is further configured to:

write valid third bit data as the first bit to the third memory cell, after writing the first bit data to the first memory cell;

write valid fourth bit data as the first bit to the fourth memory cell, after writing the third bit data to the third memory cell;

write the second bit data to the second memory cell as the first bit, after writing the fourth bit data to the fourth memory cell; and in a case where the first memory cell stores the first bit data as the first bit and does not store data as the second bit, the second memory cell stores the second bit data as the first bit and does not store data as the second bit, the third memory cell stores the third bit data as the first bit and does not store data as the second bit, and the fourth memory cell stores the fourth bit data as the first bit and does not store data as the second bit, and upon the reception of the flush command from the host, read the second bit data from the second memory cell;

read the fourth bit data from the fourth memory cell, after writing the second bit data read from the second memory cell to the first memory cell as the second bit; and write the fourth bit data read from the fourth memory cell to the third memory cell as the second bit.

11. The memory system according to claim 1, wherein the plurality of memory cells further include a third memory cell and a fourth memory cell, and the memory controller is further configured to:

write valid third bit data as the first bit to the third memory cell, after writing the first bit data to the first memory cell;

write valid fourth bit data as the first bit to the fourth memory cell, after writing the third bit data to the third memory cell;

write the second bit data to the second memory cell as the first bit, after writing the fourth bit data to the fourth memory cell; and in a case where the first memory cell stores the first bit data as the first bit and does not store data as the second bit, the second memory cell stores the second bit data as the first bit and does not store data as the second bit, the third memory cell stores the third bit data as the first bit and does not store data as the second bit, and the fourth memory cell stores the fourth bit data as the first bit and does not store data as the second bit, and upon the reception of the flush command from the host, read the second bit data from the second memory cell;

read the fourth bit data from the fourth memory cell; and write the second bit data read from the second memory cell to the first memory cell as the second bit, after writing the fourth bit data read from the fourth memory cell to the third memory cell as the second bit.

12. The memory system according to claim 1, wherein the memory controller is further configured to, after writing the second bit data to the first memory cell, manage the second bit data stored in the second memory cell as invalid data.

13. The memory system according to claim 1, wherein each of the plurality of memory cells is configured to store 4-bit data including the first bit, the second bit, a third bit, and a fourth bit in a nonvolatile manner, and the memory controller is further configured to:

perform a first write operation of writing data to the first bit and the third bit of the first memory cell; and perform a second write operation of writing data to the second bit and the fourth bit of the first memory cell, using data read from the first bit and the third bit of the first memory cell.

14. The memory system according to claim 1, wherein each of the plurality of memory cells is configured to store data in a nonvolatile manner according to a threshold voltage, each of the plurality of memory cells is configured to:

store first data including at least the first bit in response to the threshold voltage being within a first voltage range; and store second data including at least the first bit and the second bit in response to the threshold voltage being within a second voltage range narrower than the first voltage range.

15. The memory system according to claim 1, wherein the plurality of memory cells further include a fifth memory cell coupled in series to the first memory, and the memory controller is further configured to:

upon the reception of the flush command from the host, write padding data as the first bit to the fifth memory cell, and then write the second bit data read from the second memory cell to the first memory cell as the second bit.

16. A memory system comprising:

a nonvolatile memory including a plurality of memory cells, each of the plurality of memory cells being configured to store, in a nonvolatile manner, a plurality of bits of data including at least a first bit that is to be written by a first write operation and a second bit that is to be written by a second write operation, the plurality of memory cells including at least a first memory cell and a second memory cell different from the first memory cell; and a memory controller electrically coupled to the nonvolatile memory and configured to:

execute a data erase operation to the first memory cell resulting in the first memory cell storing no valid data as the first bit or the second bit;

execute a data erase operation to the second memory cell resulting in the second memory cell storing no valid data as the first bit or the second bit;

write first bit data to the first memory cell as the first bit by the first write operation; and

write second bit data to the second memory cell as the first bit by the first write operation, wherein the memory controller is further configured to:

upon reception of a flush command from a host while the first memory cell stores the first bit data as the first bit and does not store valid data as the second bit, and the second memory cell stores the second bit data as the first bit and does not store valid data as the second bit, read the first bit data from the first memory cell;

write the first bit data to the first memory cell as the second bit;

read the second bit data from the second memory cell; and write the second bit data to the second memory cell as the second bit.

17. The memory cell according to claim 16, wherein the memory controller is further configured to:

write the first bit data to the first memory cell as the second bit, and then invalidate the first bit data stored in the first memory cell as the first bit; and write the second bit data to the second memory cell as the second bit, and then invalidate the second bit data stored in the second memory cell as the first bit.

18. A method of controlling a nonvolatile memory, the nonvolatile memory including a plurality of memory cells, each of the plurality of memory cells being configured to store, in a nonvolatile manner, a plurality of bits of data including at least a first bit that is to be written by a first write operation and a second bit that is to be written by a second write operation, the plurality of memory cells including at least a first memory cell and a second memory cell different from the first memory cell, the method comprising:

executing a data erase operation to the first memory cell resulting in the first memory cell storing no valid data as the first bit or the second bit;

executing a data erase operation to the second memory cell resulting in the second memory cell storing no valid data as the first bit or the second bit;

writing first bit data to the first memory cell as the first bit by the first write operation; and writing second bit data to the second memory cell as the first bit by the first write operation, wherein the method further comprises:

receiving a flush command from a host;

upon the reception of the flush command from the host while the first memory cell stores the first bit data as the first bit and does not store valid data as the second bit, and the second memory cell stores the second bit data as the first bit and does not store valid data as the second bit, reading the second bit data from the second memory cell; and writing the second bit data read from the second memory cell to the first memory cell as the second bit.

19. The method according to claim 18, further comprising:

writing the second bit data to the second memory cell as the first bit after writing the first bit data to the first memory cell as the first bit; and upon the reception of the flush command from the host, reading the second bit data from the second memory cell; and writing the second bit data read from the second memory cell to the first memory cell as the second bit.

20. The method according to claim 18, wherein the nonvolatile memory includes a plurality of cell units, each of the plurality of cell units includes one or more of the plurality of memory cells, and the plurality of cell units include at least a first cell unit including the first memory cell and a second cell unit including the second memory cell, and the method further comprises:

reading valid data that is stored as the first bit in each of the one or more memory cells of the second cell unit including at least the second memory cell;

determining that a total amount of the valid data that are read from each of the one or more memory cells of the second cell unit after the reception of the flush command from the host has reached an amount of data that allows a write operation to be performed for the first cell unit; and upon determining that the total amount of the valid data has reached the amount of data that allows the write operation, writing the second bit data read from the second memory cell as the first bit to the first memory cell.

* * * * *